(12) United States Patent
Tajima et al.

(10) Patent No.: US 9,494,289 B2
(45) Date of Patent: Nov. 15, 2016

(54) ACTUATOR AND VEHICLE HEADLAMP

(75) Inventors: Keiichi Tajima, Shizuoka (JP); Shigeru Kuwahara, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 435 days.

(21) Appl. No.: 14/343,472

(22) PCT Filed: Sep. 6, 2012

(86) PCT No.: PCT/JP2012/072772
§ 371 (c)(1),
(2), (4) Date: Mar. 7, 2014

(87) PCT Pub. No.: WO2013/035798
PCT Pub. Date: Mar. 14, 2013

(65) Prior Publication Data
US 2014/0198516 A1    Jul. 17, 2014

(30) Foreign Application Priority Data

Sep. 7, 2011  (JP) ................. 2011-194794
Nov. 11, 2011 (JP) ................. 2011-247797
Nov. 11, 2011 (JP) ................. 2011-247798

(51) Int. Cl.
*H02K 11/00* (2016.01)
*F21S 8/10* (2006.01)
(Continued)

(52) U.S. Cl.
CPC ........... *F21S 48/1742* (2013.01); *B60Q 1/076* (2013.01); *F16H 19/08* (2013.01); *H02K 11/215* (2016.01); *Y10T 74/18792* (2015.01)

(58) Field of Classification Search
CPC ................................. H02K 11/0021

USPC ............................. 318/3, 34, 558
See application file for complete search history.

(56) References Cited

U.S. PATENT DOCUMENTS 6,445,085 B1 * 9/2002 Toda ............. B60Q 1/115
307/10.8

FOREIGN PATENT DOCUMENTS

JP    2007-128856 A    5/2007
JP    2008-94196 A     4/2008
JP    2009-23558 A     2/2009
(Continued)

OTHER PUBLICATIONS

International Search Report dated Dec. 11, 2012 issued in International Application No. PCT/JP2012/072772 (PCT/ISA/210).
(Continued)

*Primary Examiner* — David S Luo
(74) *Attorney, Agent, or Firm* — Sghrue Mion, PLLC

(57) ABSTRACT

A coupling member has a first driven portion and an output shaft to be coupled to a lamp unit, and is rotatable in the horizontal direction about the shaft center of the output shaft. A driven member has a second driven portion and a follower portion, and is rotatable relative to the coupling member. An acting portion is engaged with the follower portion. A first driving unit is engaged with the first driven portion to rotate the coupling member relative to the driven member. A second driving unit is engaged with the second driven portion to rotate the driven member relative to the coupling member. When the second driving unit rotates the driven member, the acting portion engaged with the follower portion causes the rotation center to move, and the coupling member is moved together with the driven member.

14 Claims, 20 Drawing Sheets

(51) Int. Cl.
  *B60Q 1/076* (2006.01)
  *F16H 19/08* (2006.01)

(56) References Cited

FOREIGN PATENT DOCUMENTS

| JP | 2009-183033 A | 8/2009 |
| JP | 2010-108867 A | 5/2010 |
| JP | 2010-135119 A | 6/2010 |
| JP | 2011-84151 A | 4/2011 |

OTHER PUBLICATIONS

Written Opinion dated Dec. 11, 2012 issued in International Application No. PCT/JP2012/072772 (PCT/ISA/237).

* cited by examiner

ACTUATOR AND VEHICLE HEADLAMP

TECHNICAL FIELD

The invention relates to an actuator and a vehicle headlamp.

BACKGROUND ART

There is known a vehicle headlamp in which a lamp unit having a light source and a reflector, which reflects light emitted from the light source, is arranged inside a lamp outer casing formed by a cover and a lamp housing.

The lamp unit is rotatably (tiltably) supported by a support member such as a bracket and is rotated by a driving force of an actuator (see, e.g., Patent Documents 1 and 2).

Regarding the vehicle headlamp in which the lamp unit rotates about a swivel shaft serving as a pivot, there is known a vehicle headlamp in which the swivel shaft is supported by the bracket so that it can rotate in a horizontal direction, and a shaft holding member preventing the swivel shaft from being separated from the bracket is attached to the bracket (see, e.g., Patent Document 3).

In the vehicle headlamp, the lamp unit is rotated (tilted) in an upper-lower direction by the actuator, so that a so-called leveling adjustment (leveling operation) of adjusting a deviation of an optical axis, which is changed by a weight of a vehicle-loaded object, is performed. Also, the lamp unit is rotated in a left-right direction by the actuator, so that a so-called swivel adjustment (swivel operation) of changing a direction of the optical axis to follow a traveling direction of a vehicle is performed.

In the actuator of the vehicle headlamp disclosed in Patent Document 1, a pair of gear portions is provided at left and right sides of an output gear and rack members that are respectively movable in a front-rear direction are meshed with the respective gear portions. When the two rack members are synchronously moved in the same direction along the front-rear direction, the output gear is moved in the front-rear direction and the lamp unit is rotated in the upper-lower direction, so that the leveling operation is performed. When the two rack members are synchronously moved in opposite directions along the front-rear direction, the output gear is rotated and the lamp unit is rotated in the left-right direction, so that the swivel operation is performed.

On the other hand, in the actuator of the vehicle headlamp disclosed in Patent Document 2, two driving portions each of which has a worm and a shaft portion are provided at a side and a rear of the output gear respectively. The worm positioned at the side is movable in the front-rear direction integrally with the shaft portion and the shaft portion positioned at the rear is connected to a slide member that holds the output gear. By a rotation of the worm positioned at the rear of the output gear, the shaft portion positioned at the rear is moved in the front-rear direction, so that the output gear and the slide member are integrally moved in the front-rear direction. Thereby, the lamp unit is rotated in the upper-lower direction, so that the leveling operation is performed. At this time, the worm positioned at the side and the gear portion are integrally moved in the front-rear direction. By a rotation of the worm positioned at the side, the output gear is rotated, so that the lamp unit is rotated in the left-right direction and the swivel operation is performed.

Patent Document 1: JP2007-128856A
Patent Document 2: JP2009-183033A
Patent Document 3: JP2008-94196A

SUMMARY OF INVENTION

Problems to be Solved by Invention

In the actuator disclosed in Patent Document 1, it is necessary to move the two rack members in the front-rear direction both in the leveling operation and in the swivel operation. Also, since it is necessary to synchronously move the two rack members, a control operation becomes complicated.

In the actuator disclosed in Patent Document 2, since one driving portion is positioned at the rear of the output gear, a size in the front-rear direction is increased.

Therefore, a first object of the invention is to provide a technology capable of making an actuator and a vehicle headlamp small and simplifying a control operation.

In the above vehicle headlamp, when a vehicle starts to travel, for example, an initial position of the lamp unit is detected as a preparation operation for adjusting the optical axis of the lamp unit. In the leveling operation, the lamp unit is rotated upwards or downwards, so that a predetermined part of the lamp unit or actuator is butted to a stopper and the butted position is set as the initial position. Also, in the swivel operation, the lamp unit is rotated leftwards or rightwards, so that a predetermined part of the lamp unit or actuator is butted to the stopper and the butted position is set as the initial position.

The lamp unit is rotated by a predetermined amount in the upper-lower direction or left-right direction on the basis of the detected initial position, so that the leveling operation or swivel operation is performed.

When detecting the initial position by rotating the lamp unit to thus butt the predetermined part to the stopper, the lamp unit is rotated up to each rotation limit in the forward or rearward direction, or in the leftward or rightward direction. Hence, it takes time to detect the initial position.

Also, when the lamp unit is rotated up to the rotation limit, the optical axis is largely inclined, so that the light may be irradiated in an unnecessary direction, and may cause a dazzling light to a front vehicle or to a pedestrian.

Therefore, a second object of the invention is to provide a technology capable of reducing time required to detect an initial position of a lamp unit, and preventing a dazzling light.

In the vehicle headlamp disclosed in Patent Document 3, a supported portion is formed to have a substantially hemispherical shape and the supported portion protrudes forwards. Thereby, the supported portion may interfere with a peripheral component arranged in front of the supported portion.

Also, in the vehicle headlamp disclosed in Patent Document 3, the supported portion is formed to have a substantially hemispherical shape and is pressed from above by a flat plate-shaped part of the shaft holding member. In this structure, the lamp unit and the swivel shaft may be excessively rotated together by vibrations upon the traveling of the vehicle or inertia of the lamp unit. However, if the lamp unit is provided with a projection so that the projection contacts to the bracket to prevent the excessive rotation of the lamp unit, an internal structure of the lamp outer casing becomes complicated.

Therefore, a third object of the invention is to provide a technology capable of restraining excessive rotation of a lamp unit and avoiding interference with a peripheral component with a simple structure.

Means for Solving the Problems

In order to achieve the first object, according to a first aspect of the invention, an actuator includes a coupling member having an output shaft to be coupled to a lamp unit and a first driven portion, the coupling member being rotatable in a first direction about a shaft center of the output shaft, a driven member having a second driven portion arranged on a first side of a rotation center aligned with the shaft center and a follower portion arranged on a second side of the rotation center opposite to the first side, the driven member being rotatable relative to the coupling member about the rotation center, an acting portion engaged with the follower portion, a first driving unit engaged with the first driven portion to rotate the coupling member relative to the driven member about the shaft center, and a second driving unit engaged with the second driven portion to rotate the driven member relative to the coupling member. When the second driving unit rotates the driven member, the acting portion engaged with the follower portion causes the rotation center to linearly move in a second direction and the coupling member is moved together with the driven member in the second direction.

In order to achieve the first object, according to a second aspect of the invention, a vehicle headlamp includes a lamp outer casing having a lamp housing having an opening and a cover closing the opening of the lamp housing, a lamp unit comprising a light source, the lamp unit being arranged inside the lamp outer casing, and an actuator configured to adjust an irradiation direction of light emitted from the light source. The actuator includes a coupling member having an output shaft to be coupled to a lamp unit and a first driven portion, the coupling member being rotatable in a left-right direction about a shaft center of the output shaft, a driven member comprising a second driven portion arranged on a first side of a rotation center aligned with the shaft center and a follower portion arranged on a second side of the rotation center opposite to the first side, the driven member being rotatable relative to the coupling member about the rotation center, an acting portion engaged with the follower portion, a first driving unit engaged with the first driven portion to rotate the coupling member relative to the driven member about the shaft center, and a second driving unit engaged with the second driven portion to rotate the driven member relative to the coupling member. When the second driving unit rotates the driven member, the acting portion engaged with the follower portion causes the rotation center to linearly move in a front-rear direction and the coupling member is moved together with the driven member in the front-rear direction.

According to the configuration of the first and second aspects, since the coupling member is rotated by a driving force of the first driving unit and the coupling member is moved by a driving force of the second driving unit, it is possible to achieve both downsizing and simplification of a control operation.

The first driven portion may have a first gear portion extending in an arc shape, the second driven portion may have a second gear portion extending in an arc shape, the follower portion may have a follower gear portion extending in an arc shape, the acting portion may have a rack portion, the first driving unit may have a first worm meshing with the first gear portion, and the second driving unit may have a second worm meshing with the second gear portion.

In this case, the respective parts are not unnecessarily operated due to vibrations, so that it is possible to secure the operation reliability. Also, when the coupling member is rotated and moved, the first driving unit and the second driving unit are not moved in the second (front-rear) direction. Thus, it is possible to downsize in the second (front-rear) direction.

Here, the rack portion, the first worm and the second worm may extend in the second direction.

In this case, it is possible to downsize in a direction (left-right direction) intersecting the second direction.

A shaft supporting the first worm so to be movable in the second direction may be further provided, so that when the coupling member is moved in the second direction, the first worm is moved relative to the shaft in the second direction.

In this case, when the coupling member is moved in the second (front-rear) direction, a meshing state of the first gear portion and the first worm is not released, so that it is possible to improve the operation reliability in the actuator.

A guide member that guides the coupling member in the second direction when the second driving unit causes the driven member to rotate relative to the coupling member may be further provided.

In this case, the coupling member is securely moved in the second (front-rear) direction, so that it is possible to improve the operation reliability.

In order to achieve the second object, according to a third aspect of the invention, an actuator includes a coupling unit having an output shaft to be connected to a lamp unit, at least the output shaft being rotatable in a first direction and movable in a second direction, a first magnetic detection part configured to detect a first boundary of magnetic poles to detect a moving position of the coupling unit in the second direction, and a second magnetic detection part configured to detect a second boundary of magnetic poles to detect a rotating position of the coupling unit in the first direction. The first boundary and the second boundary are provided on the coupling unit.

In order to achieve the second object, according to a fourth aspect of the invention, a vehicle headlamp includes a lamp outer casing having a lamp housing having an opening and a cover closing the opening of the lamp housing, a lamp unit having a light source, the lamp unit being arranged inside the lamp outer casing, and an actuator configured to adjust an irradiation direction of light emitted from the light source. The actuator includes a coupling unit having an output shaft to be connected to a lamp unit, at least the output shaft being movable in a front-rear direction and rotatable in a left-right direction, a first magnetic detection part configured to detect a first boundary of magnetic poles to detect a moving position of the coupling unit in the front-rear direction, and a second magnetic detection part configured to detect a second boundary of magnetic poles to detect a rotating position of the coupling unit in the left-right direction. The first boundary and the second boundary are provided on the coupling unit.

According to the configurations of the third and fourth aspects, the initial positions relating to the rotating and moving operations of the lamp unit are detected on the basis of the boundary of the magnetic poles.

Therefore, it is possible to detect the initial position of the coupling unit without rotating the lamp unit to a movable limit, so that it is possible to shorten the detection time of the initial position and to prevent a dazzling light.

The first magnetic detection part is arranged at a position that faces a moving path of a shaft center of the output shaft in the second direction.

In this case, it is possible to detect the moving position of the coupling unit quickly and precisely.

The first magnetic detection part and the second magnetic detection part may be arranged side by side in the first direction.

In this case, it is possible to detect the rotating position of the coupling unit quickly and precisely.

A detection magnet having the first boundary and the second boundary may be attached to the coupling unit.

In this case, it is not necessary to individually provide detection magnets so as to respectively detect the initial position before the rotating operation and the moving operation of the lamp unit start, so that it is possible to reduce the number of components of the actuator and to simplify the mechanism In order to achieve the third object, according to a fifth aspect of the invention, a vehicle headlamp includes a lamp unit configured to forwardly irradiate light emitted from a light source, the lamp unit being rotatable at least in a left-right direction. a swivel shaft having a supported portion, the swivel shaft being attached to the lamp unit in an upwardly protruding manner and serving as a pivot of a rotation in the left-right direction, a bracket supporting the supported portion so as to be rotatable in the left-right direction; and a shaft holding member attached to the bracket and holding the swivel shaft. The supported portion includes a pressed face pressed by the shaft holding member from above, a slide face having an upper edge contiguous with an outer peripheral edge of the pressed face and configured to slide when the lamp unit rotates, and a restrained face having an upper edge contiguous with the outer peripheral edge of the pressed face and is configured to contact the shaft holding member when the swivel shaft is rotated by a given angle or more. A distance from a rotation center of the swivel shaft to the upper edge of the restrained face is shorter than a distance from the rotation center of the swivel shaft to the upper edge of the slide face.

According to the above configuration, since a protruding of the supported portion of the swivel shaft towards the restrained face can be made to be small, it is possible to avoid the interference between the supported portion and shaft holding member and the peripheral components to be arranged around the same.

Also, since the restrained face of the swivel shaft is contacted to the shaft holding member, so that the excessive rotation of the lamp unit is prevented, it is not necessary to separately provide a structure for restraining the excessive rotation in the vehicle headlamp. Therefore, it is possible to restrain the excessive rotation of the lamp unit while simplifying the structure.

The bracket may be made of a resin material, the swivel shaft may be made of a resin material, and an intermediate member made of a metal material and interposed between the bracket and the swivel shaft such that the supported portion is bought into sliding-contact with the intermediate member when the lamp unit rotates may be further provided.

In this case, when the swivel shaft rotates, since the supported portion made of the resin material is brought into sliding-contacted with the intermediate member made of the metal material, cut powders resulting from the sliding contact are less likely to be generated and the swivel shaft and the bracket are less likely to be worn. Therefore, the durability of the swivel shaft and the bracket is improved, so that it is possible to maintain the smooth operating state of the lamp unit.

The pressed face may be have a restrained protrusion protruding upwards, and the holding member may have a holding portion that presses the swivel shaft from above and having a restraint part to which the restrained protrusion is inserted.

In this case, since a force against the moving of the swivel shaft is applied to the restrained protrusion by the restraint part of the shaft holding member, it is possible to restrain the moving of the swivel shaft. Thus, it is possible to prevent a positional shift of the lamp unit from the bracket.

EMBODIMENTS OF THE INVENTION

Hereinafter, embodiments of the invention will be described in detail with reference to the accompanying drawings.

Figure 1:
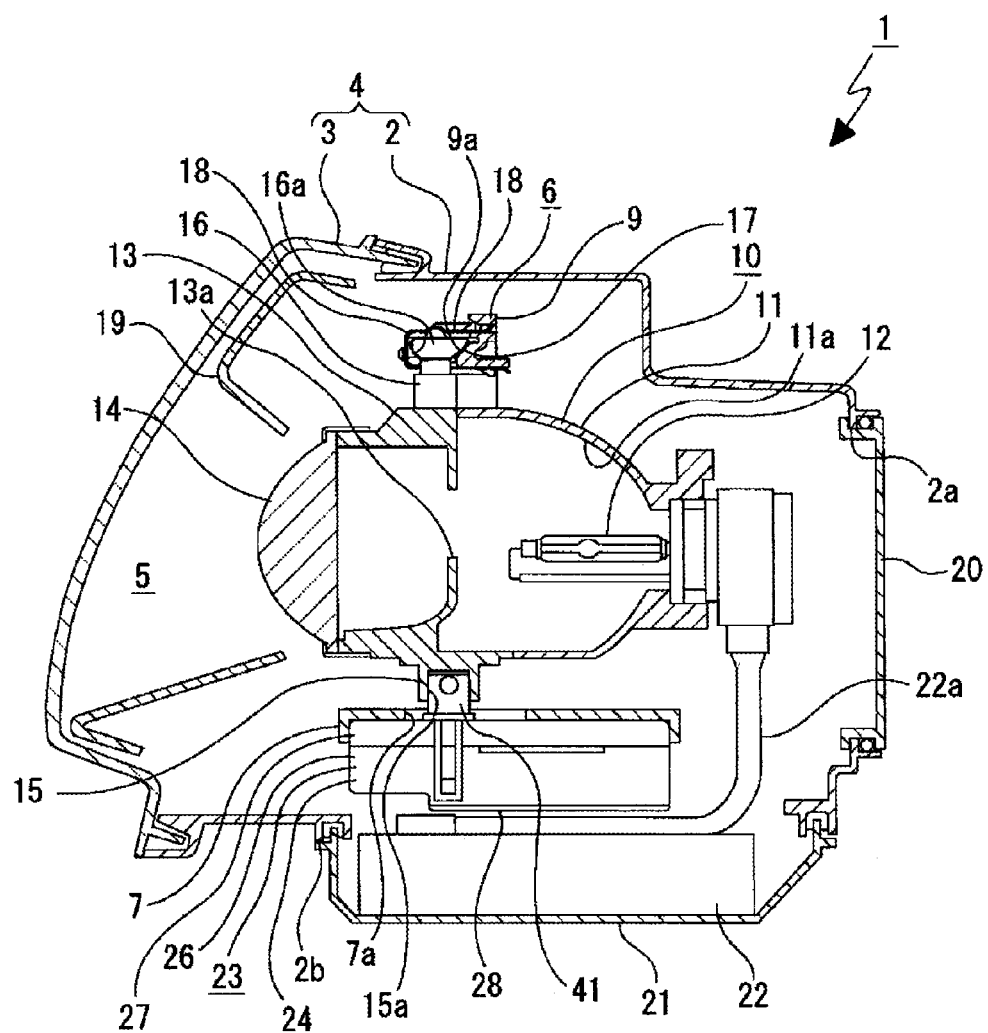
FIG. 1 is a longitudinally sectional view illustrating an internal configuration of a vehicle headlamp according to a first embodiment of the invention.

FIG. 1 is a longitudinally sectional view illustrating an internal structure of a vehicle headlamp 1 according to a first embodiment of the invention. The vehicle headlamp 1 is mounted at left and right end portions of a front end of a vehicle body, respectively.

The vehicle headlamp 1 has a lamp housing 2 having a forwardly opened recess portion and a cover 3 closing an opening face of the lamp housing 2. A lamp outer casing 4 is formed by the lamp housing 2 and the cover 3. An internal space of the lamp outer casing 4 is formed as a lamp chamber 5.

A rear end portion of the lamp housing 2 is formed with an attaching opening 2a penetrating in a front-rear direction. A lower end portion of the lamp housing 2 is formed with an arranging opening 2b penetrating in an upper-lower direction.

Figure 2:
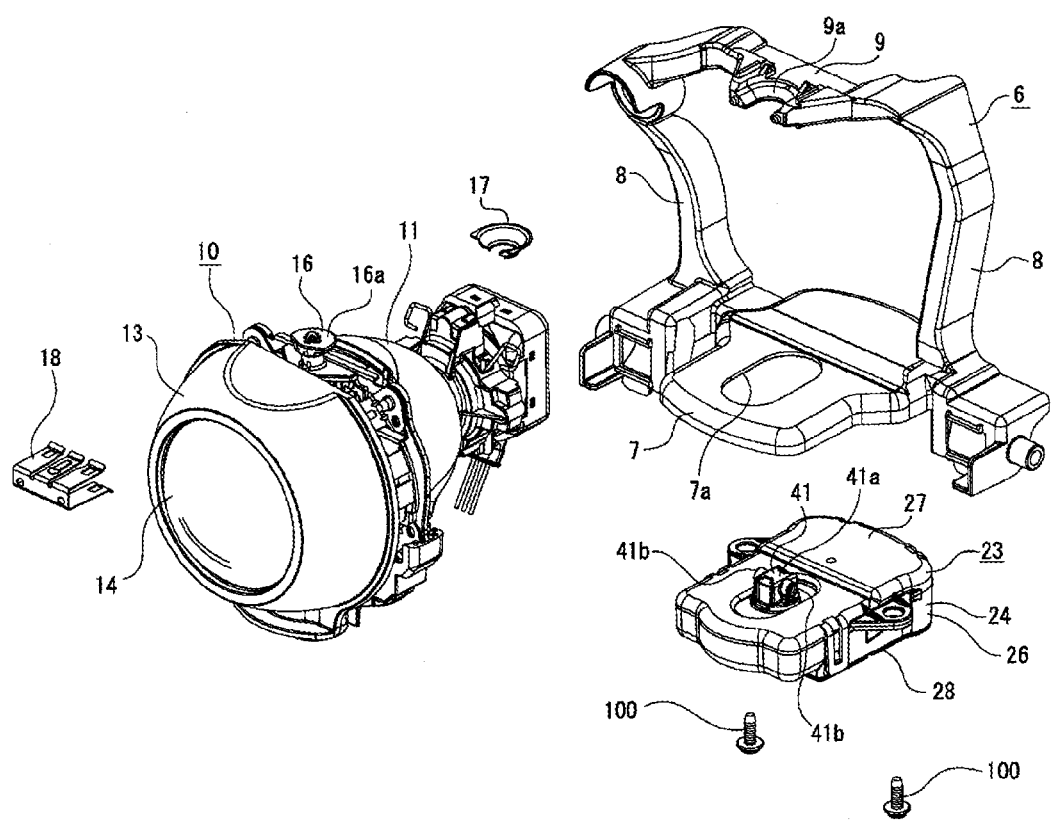
FIG. 2 is an exploded perspective view illustrating a mechanism arranged inside a lamp chamber of the vehicle headlamp.

In the lamp chamber 5, a bracket 6 is arranged. The bracket 6 is supported by the lamp housing 2 so that it can be tilted in left-right and upper-lower directions by an aiming adjustment mechanism (not shown). As shown in FIGS. 1 and 2, the bracket 6 has a mounting portion 7 directed in the upper-lower direction, a pair of pillar portions 8 protruding upwards from left and right end portions of the mounting portion 7, respectively, and a suspension portion 9 connecting upper end portions of the respective pillar portions 8. A central portion of the suspension portion 9 in the left-right direction is formed with a support receiving portion 9a.

The mounting portion 7 is formed with a mounting hole 7a penetrating in the upper-lower direction.

In the lamp chamber 5, a lamp unit 10 is arranged. The lamp unit 10 is supported by the bracket 6 so that it can be rotated in the upper-lower and left-right directions.

The lamp unit 10 has a reflector 11 that reflects light on an inner surface thereof, a light source 12 held at a rear end portion of the reflector 11, a lens holder 13 attached to a front end of the reflector 11, and a projection lens 14 held at a front end portion of the lens holder 13.

The reflector 11 has a forwardly opened bowl shape and the inner surface thereof is formed as a reflecting surface 11a.

As the light source 12, a discharge lamp is used, for example. A semiconductor light emitting device such as a light emitting diode (LED) may also be used as the light source 12.

The lens holder 13 is provided with a shade 13a. The shade 13a is provided to protrude into the lamp unit 10. The shade 13a has a function of shielding a part of the light emitted from the light source 12.

A lower end portion of the lamp unit 10 is provided with a downwardly protruded coupling protrusion 15. The coupling protrusion 15 is formed with a downwardly opened coupling recess portion 15a.

As shown in an exploded perspective view of FIG. 2, an upper end portion of the lamp unit 10 is provided with a supported protrusion 16. An upper end portion of the supported protrusion 16 is formed as a downwardly convex and substantially hemispherical sliding portion 16a. The sliding portion 16a of the supported protrusion 16 is held by a slide ring 17.

The lamp unit 10 is rotatably suspended at the support receiving portion 9a of the suspension portion 9 via the slide ring 17. Sliding of the sliding portion 16a with respect to the slide ring 17 enables the lamp unit 10 to rotated about the sliding portion 16a serving as a pivot in the upper-lower and left-right directions with respect to the bracket 6.

A holding member 18 is attached to the suspension portion 9. The holding member 18 prevents the lamp unit 10 from falling out of the bracket 6.

At a front end-side of the lamp chamber 5, an extension 19 is arranged to shields a part of the lamp unit 10 (see FIG. 1).

A back cover 20 closing the attaching opening 2a is attached to a rear end portion of the lamp housing 2.

A mounting cover 21 closing the arranging opening 2b is attached to a lower end portion of the lamp housing 2. The mounting cover 21 has a shape of an upwardly opened box.

In the mounting cover 21, a discharge lamp lighting device 22 is mounted. The discharge lamp lighting device 22 is a device for turning on the light source 12 and has a lighting circuit therein.

The discharge lamp lighting device 22 is connected to the light source 12 by a cable 22a. The cable 22a is arranged to extend downwards from the rear of the lamp unit 10.

As shown in FIGS. 1 and 2, an actuator 23 is arranged at a lower side of the lamp unit 10. The actuator 23 has a case body 24.

Figure 3:
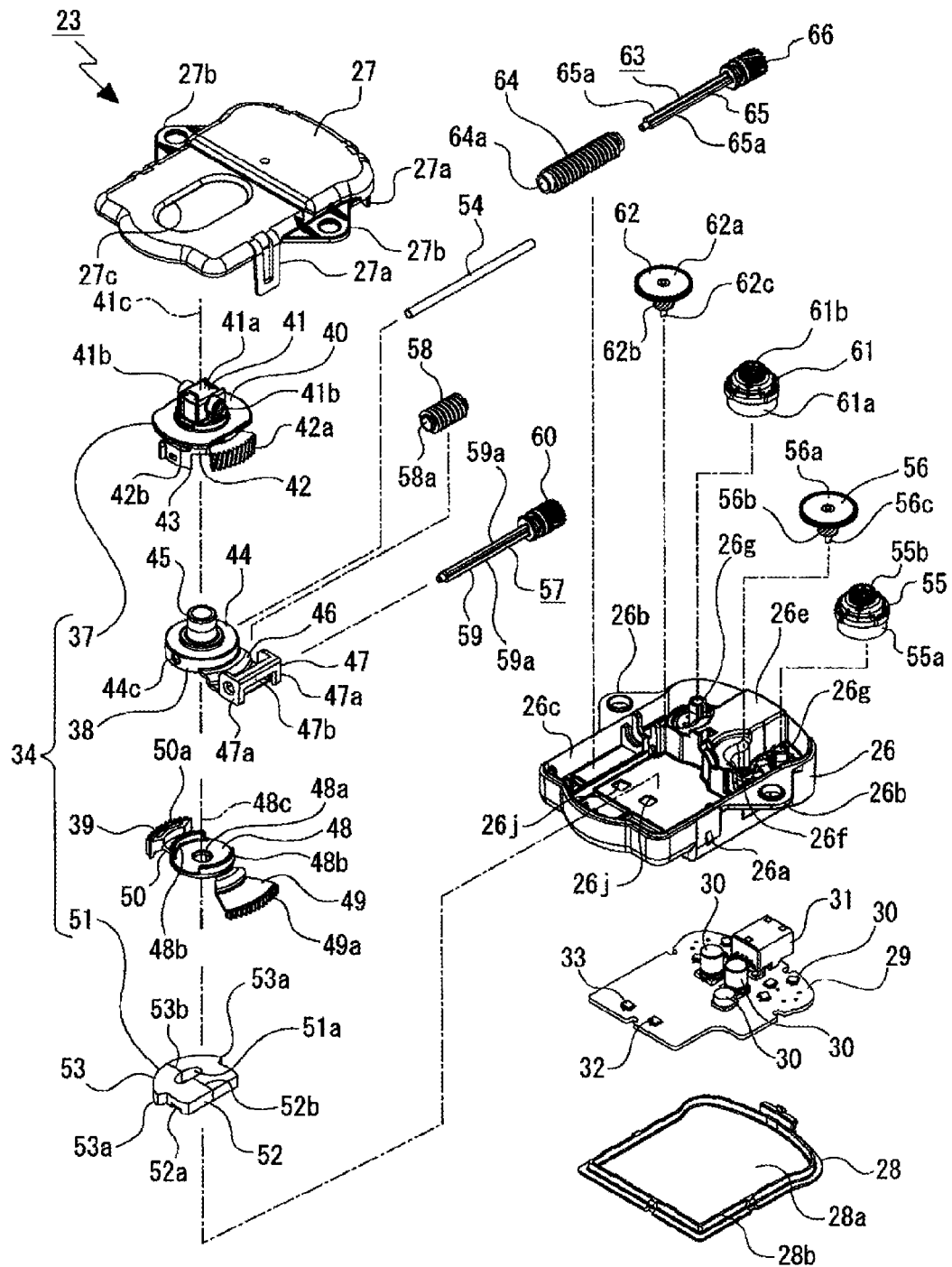
FIG. 3 is an exploded perspective view of an actuator.
Figure 4:
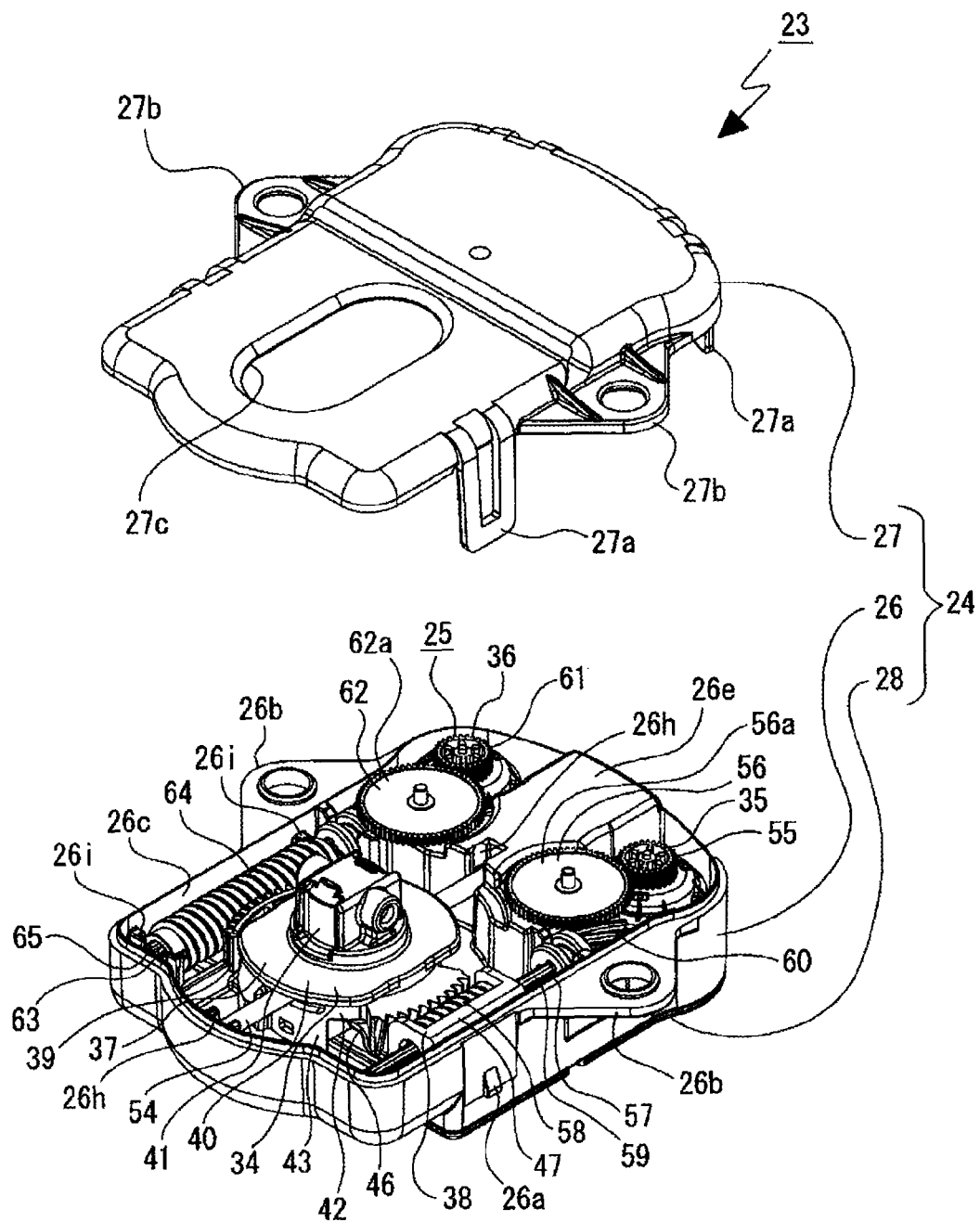
FIG. 4 is a perspective view illustrating the actuator with a cover case being removed.

The case body 24 has a arrangement case 26 having a shape of an upwardly opened box, a cover case 27 closing the arrangement case 26 from above, and a base case 28 attached to the arrangement case 26 from below. FIG. 3 is an exploded perspective view of the actuator 23 and FIG. 4 is a perspective view illustrating the actuator 23 with the cover case 27 being removed.

An outer peripheral surface of the arrangement case 26 is provided with a plurality of engaging protrusions 26a in a circumferentially spaced manner. An upper end portion of the arrangement case 26 is provided with a pair of attached protrusions 26b protruding leftwards and rightwards, respectively.

Figure 5:
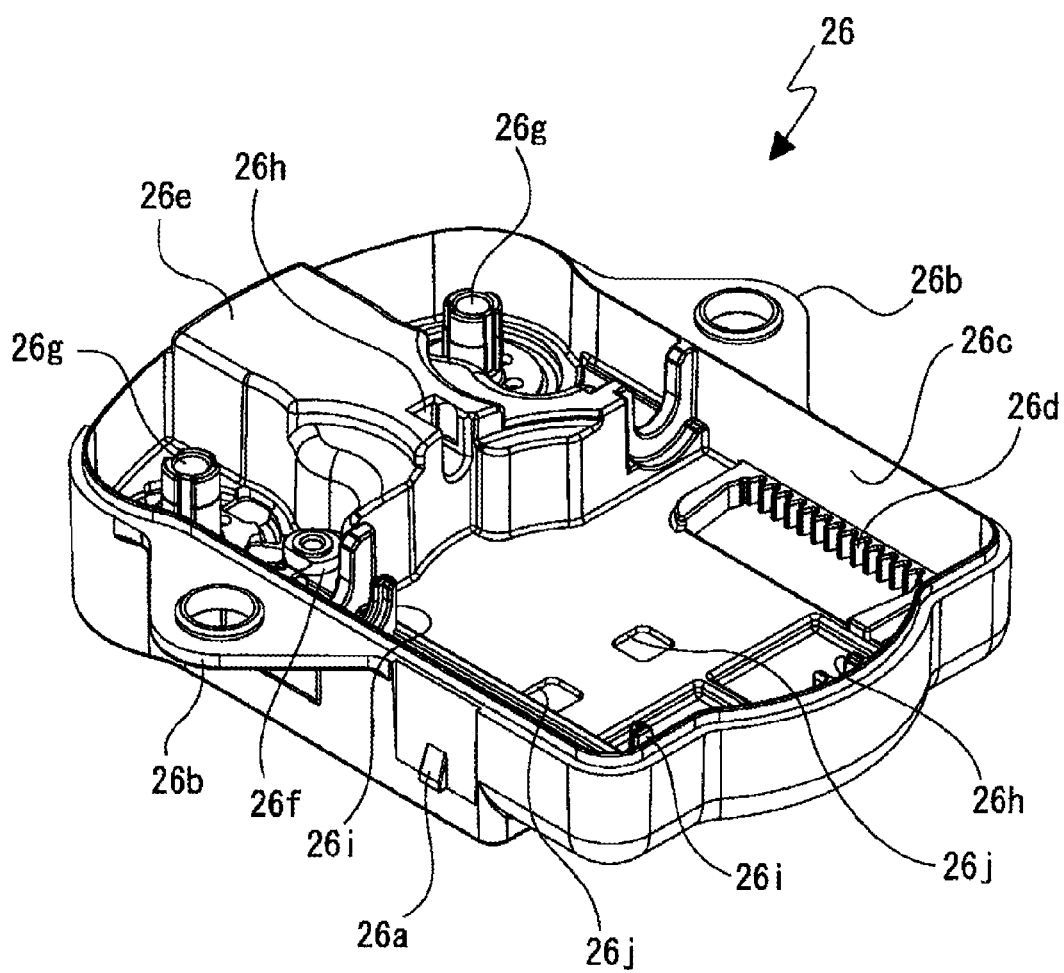
FIG. 5 is a perspective view illustrating a mounting case of the actuator.

FIG. 5 is a perspective view illustrating the arrangement case 26. A front half part of the arrangement case 26 is formed with a upwardly opened mechanism arranging recess portion 26c. An inner surface of a left side surface portion of the arrangement case 26 is provided with a rack portion 26d extending in the front-rear direction. The rack portion 26d is provided in the mechanism arranging recess portion 26c. The rack portion 26d functions as an acting portion of the invention, which is engaged with a follower portion that will be described later.

A rear end-side part of a central portion of the arrangement case 26 in the left-right direction is provided with an upwardly protruded arrangement portion 26e. The protruded arrangement portion 26e has a shape that is opened downward and rearward.

At a rear side of the mechanism arranging recess portion 26c, the arrangement case 26 is provided with a pair of gear support protrusions 26f and a pair of motor attaching protrusions 26g spaced in the front-rear direction. The gear support protrusions 26f and the motor attaching protrusions 26g are arranged at left and right sides of the protruded arrangement portion 26e and protrude upwards from left and right end portions of a bottom part thereof.

The central portion of the arrangement case 26 in the left-right direction is formed with a pair of attaching recess portions 26h that is spaced in the front-rear direction. The attaching recess portions 26h are respectively positioned at a front face portion of the arrangement case 26 and at a front end portion of the protruded arrangement portion 26e.

A right end portion of the mechanism arranging recess portion 26c of the arrangement case 26 is provided with a pair of upwardly protruding bearings 26i that are spaced in the front-rear direction.

The bottom part of the arrangement case 26 is formed with a pair of arrangement holes 26j penetrating in the upper-lower direction and is spaced in the left-right direction. A lower face-side of the arrangement case 26 is formed with a shallow arranging recess portion 26k that is opened downwards.

The cover case 27 has a thin box shape that is opened downwards. An outer peripheral surface of the cover case 27 is provided with a plurality of engaging pieces 27a protruding downwards. The engaging pieces 27a are respectively formed with an engaging hole.

The cover case 27 is provided with a pair of attached protrusions 27b protruding in the left-right direction, respectively. At a location near the front end of the cover case 27, an insertion hole 27c is formed by penetrating in the upper-lower direction. The insertion hole 27c has a shape that is elongated in the front-rear direction.

As shown in FIG. 3, the base case 28 has a closing face portion 28a having a plate shape directed in the upper-lower direction and a fitting protrusion-shaped part 28b protruding upwards from a portion near an outer periphery of the closing face portion 28a.

A circuit board 29 is arranged in the arranging recess portion 26k of the arrangement case 26. The circuit board 29 is formed with a predetermined circuit pattern (not shown). On the circuit board 29, a plurality of electronic components 30 and a connector 31 are mounted. Some of the electronic components 30 and the connector 31 are arranged in the protruded arrangement portion 26e.

At location near the front end of an upper face of the circuit board 29, a first magnetic detection part 32 and a second magnetic detection part 33 are arranged so as to be spaced in the left-right direction. As the first magnetic detection part 32 and the second magnetic detection part 33, a hole IC (Integrated Circuit) is used, for example.

As shown in FIG. 4, the actuator 23 has a drive mechanism 25. The drive mechanism 25 has a coupling unit 34, a first driving unit 35 and a second driving unit 36.

Figure 7:
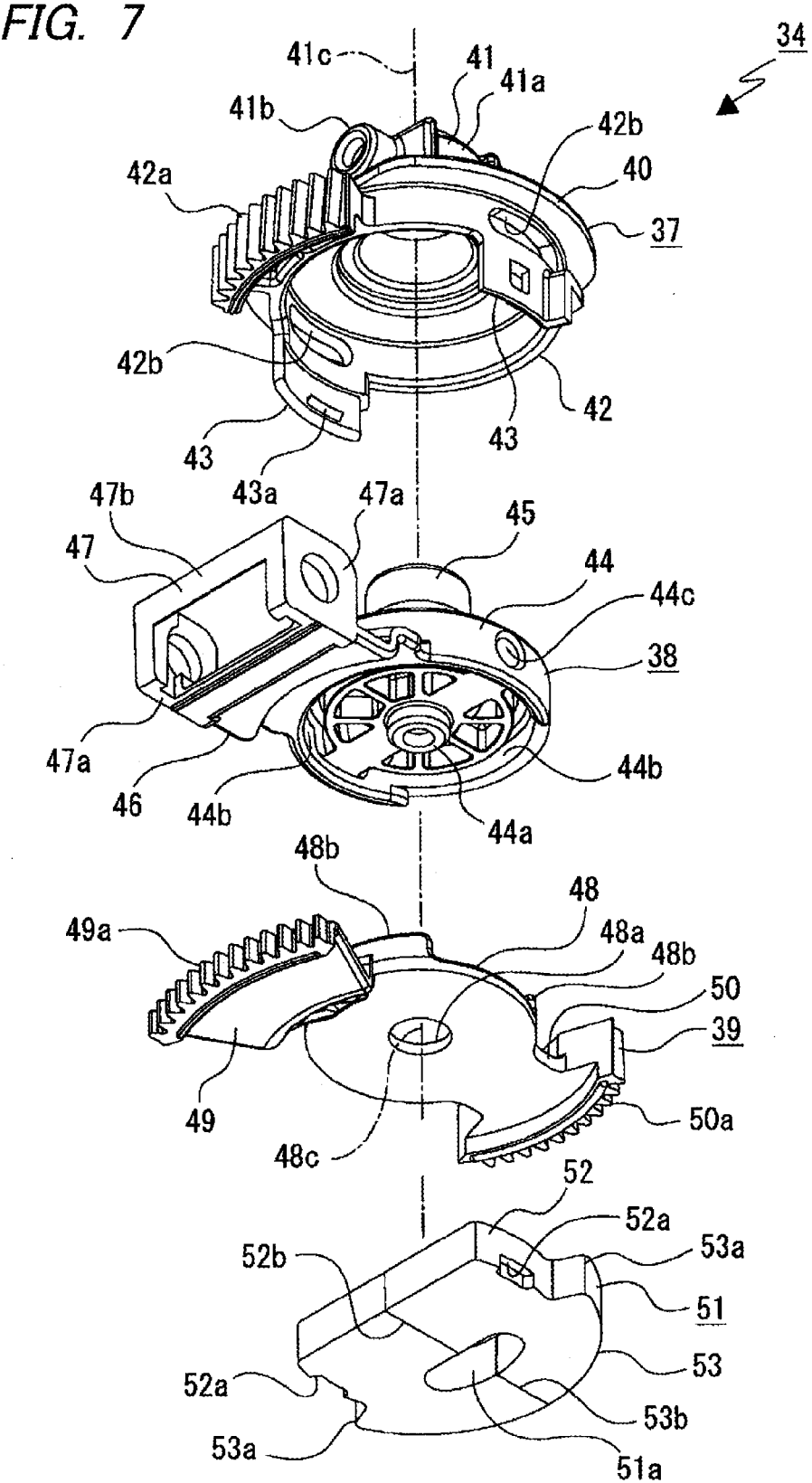
FIG. 7 is an exploded perspective view illustrating a coupling unit of the actuator.

FIG. 7 is an exploded perspective view of the coupling unit 34. The coupling unit 34 has a coupling member 37, a support member 38 and a driven member 39 that are sequentially coupled from the upper side (also refer to FIG. 3).

The coupling member 37 has a plate-shaped base face portion 40 facing in the upper-lower direction, an output shaft 41 protruding upwards from a central portion of the base face portion 40, an annular part 42 protruding downwards from a portion near an outer periphery of the base face portion 40, and a pair of attaching protrusions 43 protruding downwards from the annular part 42.

The output shaft 41 has a coupling base part 41a having a shape of an downwardly opened case and a pair of coupling protrusions 41b each having a shape of a round shaft and respectively protruding in the left-right direction from left and right sides of the coupling base part 41a. A central axis of the output shaft 41 is a shaft center 41c that is a rotation axis of the coupling member 37.

A left side part of the annular part 42 is provided with a first gear portion 42a extending in a circumferential direction. The first gear portion 42a functions as a first driven portion of the invention. Both front and rear face portions of the annular part 42 are formed with a pair of insertion holes 42b that is horizontally long and extending in the circumferential direction.

The attaching protrusions 43 protrude downwards from the front and rear face portions of the annular part 42 and have engaging protrusions 43a on inner surfaces thereof.

The support member 38 has a substantially cylindrically-shaped short base part 44 of which an axis direction is the upper-lower direction, an insertion shaft portion 45 protruding upwards from a central portion of the base part 44, a protrusion face portion 46 protruding leftwards from a lower end portion of a left side part of the base part 44 and a gear supporting portion 47 provided at a left end portion of the protrusion face portion 46.

The base part 44 is provided with a support protrusion 44a protruding downwards from a central portion of a lower face thereof (see FIG. 7). At a location near the outer periphery of the base part 44, a pair of insertion recess portions 44b is formed in a spaced manner in a circumferential direction of the base part 44. Each insertion recess portion 44b has an arc shape in a plan view. The base part 44 is formed with a guided hole 44c penetrating in the front-rear direction (see FIGS. 3 and 7).

The gear supporting portion 47 has a pair of support walls 47a that is spaced in the front-rear direction and a bridge part 47b that extends in the front-rear direction and connects the support walls 47a. Each support wall 47a has a plate shape of which a principal surface faces in the front-rear direction, and is formed with an insertion hole.

The driven member 39 has a base face portion 48 having a circular shape that faces in the upper-lower direction, a first protrusion 49 protruding leftwards from the base face portion 48 and a second protrusion 50 protruding rightwards from the base face portion 48.

A central portion of the base face portion 48 is formed with a supported hole 48a penetrating in the upper-lower direction. An outer peripheral surface of the base face portion 48 is provided with a pair of insertion projections 48b protruding upwards, which are spaced in a circumferential direction of the base face portion 48. Each insertion projection 48b has an arc shape, when seen from the plan view. A length of each insertion projection 48b in the circumferential direction is shorter than a length of the corresponding insertion recess portion 44b of the support member 38 in the circumferential direction.

A central axis of the base face portion 48 is a rotation center 48c aligned with the shaft center 41c of the coupling member 37.

A left side part of the first protrusion 49 is provided with a follower gear portion 49a extending in the circumferential direction. The follower gear portion 49a is engaged with the rack portion 26d provided on the arrangement case 26 to function as an engaging part of the invention, and functions as a follower portion of the invention.

A right side part of the second protrusion 50 is provided with a second gear portion 50a extending in the circumferential direction. The second gear portion 50a functions as a second driven portion of the invention.

The follower gear portion 49a and the second gear portion 50a are arranged on a concentric circle having the rotation center 48c.

As the insertion shaft portion 45 is inserted into the output shaft 41 from below, the base part 44 is inserted into the annular part 42 from below, so that the support member 38 is coupled to the coupling member 37. In a state in which the support member 38 is coupled to the coupling member 37, the coupling member 37 can rotate relative to the support member 38 about the rotation center 41c.

The respective insertion projections 48b of the base face portion 48 are inserted into the corresponding insertion recess portions 44b of the base part 44 from below, so that the driven member 39 is slidably engaged. Also, the support protrusion 44a of the base part 44 is inserted into the supported hole 48a of the base face portion 48 from above and is thus coupled to the support member 38.

As described above, in a state in which the coupling member 37, the support member 38 and the driven member 39 are coupled, the shaft center 41c of the coupling member 37 is aligned with the rotation center 48c of the driven member 39.

In a state in which the coupling member 37, the support member 38 and the driven member 39 are connected, a detection magnet 51 is attached to the attaching protrusions 43 of the coupling member 37. The detection magnet 51 has an N pole magnetized part and an S pole magnetized part having the same shape and the same size and arranged side by side in the front-rear direction. The detection magnet 51 has a longitudinally extending first portion 52 having a substantially rectangular shape and a second portion 53 that continues to a right side of the first portion 52 and has an arc-shaped outer periphery. Front and rear sides of the first portion 52 are formed with a pair of engaging notches 52a. The second portion 53 is provided with a pair of protrusions 53a protruding in the front-rear direction than front and rear ends of the first portion 52.

The detection magnet 51 is formed with a non-interference hole 51a penetrating in the upper-lower direction between the first portion 52 and the second portion 53. Interference between a magnetic field occurring at the first portion 52 and a magnetic field occurring at the second portion 53 is suppressed by the non-interference hole 51a. A touching part between the N pole and the S pole of the first portion 52 is formed as a first boundary 52b and a touching part between the N pole and the S pole of the second portion 53 is formed as a second boundary 53b.

The engaging protrusions 43a of the respective attaching protrusions 43 are engaged with the corresponding engaging notches 52a, so that the detection magnet 51 is attached to the driven member 39. At this time, the first boundary 52b intersects with the shaft center 41c of the coupling member 37. The detection magnet 51 is rotated integrally with the coupling member 37.

The follower gear portion 49a of the driven member 39 of the coupling unit 34 is meshed with the rack portion 26d provided on the arrangement case 26. At this time, a guide member 54 having a shape of a round shaft is inserted into the guided hole 44c of the support member 38 and the insertion holes 42b of the coupling member 37. Both front and rear end portions of the guide member 54 are inserted into the attaching recess portions 26h of the arrangement case 26, respectively. By the guide member 54 attached in this way, the support member 38 is guided in the front-rear direction.

As shown in FIG. 4, the first driving unit 35 has a swivel motor 55, a first transmission gear 56, a first shaft 57 and a first worm 58.

As shown in FIG. 3, the swivel motor 55 has a main body 55a and a drive gear 55b that is fixed to a motor shaft protruding upwards from the main body 55a. The swivel motor 55 is attached to the left motor attaching protrusion 26g provided on the arrangement case 26.

The first transmission gear 56 has a spur gear portion 56a positioned at the upper side and a worm part 56b positioned at the lower side. The first transmission gear 56 is rotatably supported by the left gear support protrusion 26f provided on the arrangement case 26 via the support shaft 56c and the spur gear portion 56a is meshed with the drive gear 55b of the swivel motor 55.

The first shaft 57 has a shaft portion 59 that extends in the front-rear direction and a gear portion 60 that is provided at a rear end portion thereof. An outer peripheral surface of the shaft portion 59 is provided with three rotation stopping parts 59a that are equally spaced in the circumferential direction and protrude in a diametrical direction. The gear portion 60 of the first shaft 57 is meshed with the worm part 56b of the first transmission gear 56.

The first worm 58 has a shaft insertion hole 58a penetrating in the front-rear direction. A sectional shape of the shaft insertion hole 58a is the same as that of the first shaft 57.

The first worm 58 is arranged between the support walls 47a provided on the gear supporting portion 47 of the support member 38, and the shaft portion 59 of the first shaft 57 is inserted into the insertion holes of the support walls 47a and the shaft insertion hole 58a. The first worm 58 is arranged at a left end portion of the mechanism arranging recess portion 26c of the arrangement case 26. In a state in which the shaft portion 59 is inserted into the shaft insertion hole 58a of the first worm 58, the first worm 58 can be rotated integrally with the first shaft 57 and can be moved relative to the shaft portion 59 in the front-rear direction.

The first worm 58 is meshed with the first gear portion 42a of the coupling member 37.

In the first driving unit 35, when the swivel motor 55 is rotated, a driving force thereof is transmitted in order of the first transmission gear 56, the gear portion 60 of the first shaft 57 and the first worm 58, so that the first worm 58 is rotated. Thereby, the first gear portion 42a is sent in a direction along the rotating direction of the swivel motor 55. As the first gear portion 42a is sent, the coupling member 37 is rotated relative to the support member 38.

The second driving unit 36 has a leveling motor 61, a second transmission gear 62, a second shaft 63 and a second worm 64.

The leveling motor 61 has a main body 61a and a drive gear 61b that is fixed to a motor shaft protruding upwards from the main body 61a. The leveling motor 61 is attached to the right motor attaching protrusion 26g provided on the arrangement case 26.

The second transmission gear 62 has a spur gear portion 62a positioned at the upper side and a worm part 62b positioned at the lower side. The second transmission gear 62 is rotatably supported by the right gear support protrusion 26f provided on the arrangement case 26 via the support shaft 62c and the spur gear portion 62a is meshed with the drive gear 61b of the leveling motor 61.

The second shaft 63 has a shaft portion 65 that extends in the front-rear direction and a gear portion 66 that is provided at a rear end portion thereof. An outer peripheral surface of the shaft portion 65 is provided with three rotation stopping parts 65a that are equally spaced in the circumferential direction and protrude in a diametrical direction. The gear portion 66 of the second shaft 63 is meshed with the worm part 62b of the second transmission gear 62.

The second worm 64 has a shaft insertion hole 64a penetrating in the front-rear direction. A sectional shape of the shaft insertion hole 64a is the same as that of the second shaft 63.

The shaft portion 65 of the second shaft 63 is inserted into the shaft insertion hole 64a of the second worm 64. The shaft portion 65 is rotatably supported by a pair of bearings 26i provided on the arrangement case 26. Thereby, the second worm 64 is arranged at a right end portion in the mechanism arranging recess portion 26c of the arrangement case 26. In a state in which the shaft portion 65 is inserted into the shaft insertion hole 64a of the second worm 64, the second worm 64 can be rotated integrally with the second shaft 63.

The second worm 64 is meshed with the second gear portion 50a of the driven member 39.

In the second driving unit 36, when the leveling motor 61 is rotated, a driving force thereof is transmitted in order of the drive gear 61b, the second transmission gear 62, the gear portion 66 of the second shaft 63 and the second worm 64, so that the second worm 64 is rotated. Thereby, the second gear portion 50a is sent in a direction along the rotating direction of the leveling motor 61. As the second gear portion 50a is sent, the meshing position of the driven member 39 with the rack portion 26d of the follower gear portion 49a is changed and the driven member 39 is moved in the front-rear direction while being rotated. As the driven member 39 is moved in the front-rear direction while being rotated, the pair of insertion projections 48b is slid relative to the base part 44 of the support member 38, and the support member 38 and the coupling member 37 are integrally moved in the front-rear direction. At this time, the shaft center 41c of the coupling member 37 and the rotation center 48c of the supported member 39 are linearly moved only in the front-rear direction without being displaced in the left-right direction.

Figure 6:
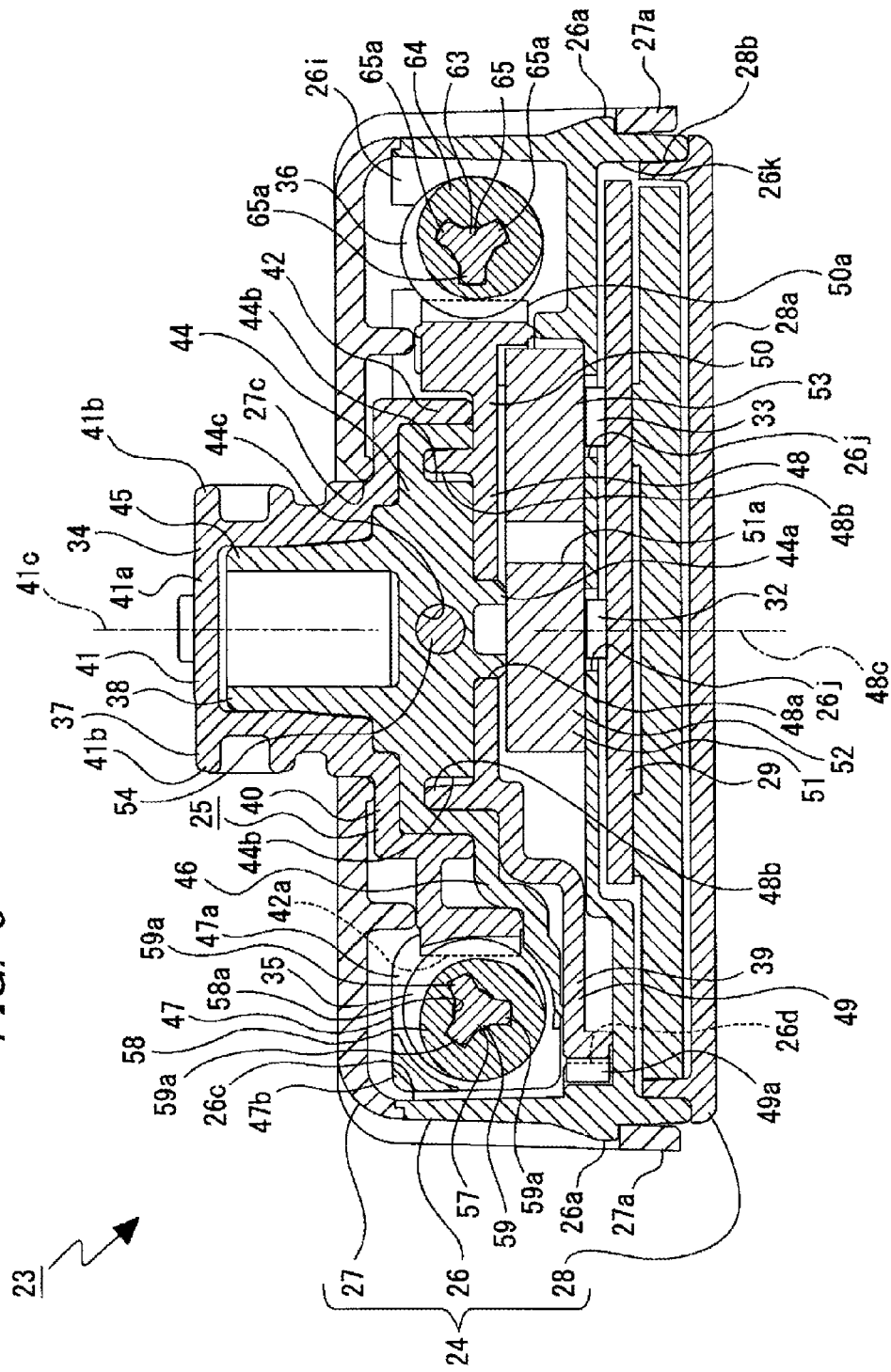
FIG. 6 is a longitudinally sectional view illustrating the assembled actuator.

FIG. 6 is a longitudinally sectional view illustrating the assembled actuator 23. The respective engaging protrusions 26a of the arrangement case 26 are engaged with the corresponding engaging pieces 27a of the cover case 27, so that the arrangement case 26 and the cover case 27 are coupled.

In a state in which the cover case 27 is coupled with the arrangement case 26, the output shaft 41 of the coupling member 37 protrudes upwards through the insertion hole 27c of the cover case 27. Also, the respective attached protrusions 27b of the cover case 27 and the corresponding attached protrusions 26b of the arrangement case 26 overlap with each other in the upper-lower direction (see FIG. 2).

The fitting protrusion-shaped part 28b of the base case 28 is fitted into the arranging recess portion 26k of the arrangement case 26, so that the base case 28 is coupled to the lower face side of the arrangement case 26. The base case 28 covers the circuit board 29 from below.

The actuator 23 having the pair of attached protrusions 27b and the pair of attached protrusions 26b overlapping with each other in the upper-lower direction is attached to the mounting portion 7 of the bracket 6 by a pair of attaching screws 100. In a state in which the actuator 23 is attached to the mounting portion 7, the output shaft 41 protrudes upwards through the mounting hole 7a.

The output shaft 41 is inserted into the coupling recess portion 15a formed at the coupling protrusion 15 of the lamp unit 10 and is thus coupled to the lamp unit 10.

In a state in which the output shaft 41 is coupled to the lamp unit 10, as the output shaft 41 is horizontally rotated, the lamp unit 10 is rotated in the left-right direction about the supported protrusion 16 serving as a pivot. Also, as the output shaft 41 is moved in the front-rear direction, the lamp unit 10 is rotated in the upper-lower direction relative to the coupling protrusions 41b about the supported protrusion 16 serving as a pivot.

In the following, the swivel operation and the leveling operation in the vehicle headlamp 1 will be described with reference to FIGS. 8 to 11. In the drawings, the lamp unit 10 is not shown and the operations of the drive mechanism 25 are shown in top views.

The swivel operation is an operation of rotating the lamp unit 10 in the left-right direction so as to change a direction of an optical axis in connection with a traveling direction of a vehicle. At this time, the lamp unit 10 is rotated in the left-right direction about the supported protrusion 16 serving as a pivot.

The leveling operation is an operation of rotating the lamp unit 10 in the upper-lower direction so as to adjust a deviation of the optical axis that is changed by a weight of a vehicle-loaded object. At this time, the lamp unit 10 is rotated in the upper-lower direction about the supported protrusion 16 serving as a pivot.

First, the swivel operation is described with reference to FIGS. 8 and 9.

Figure 8:
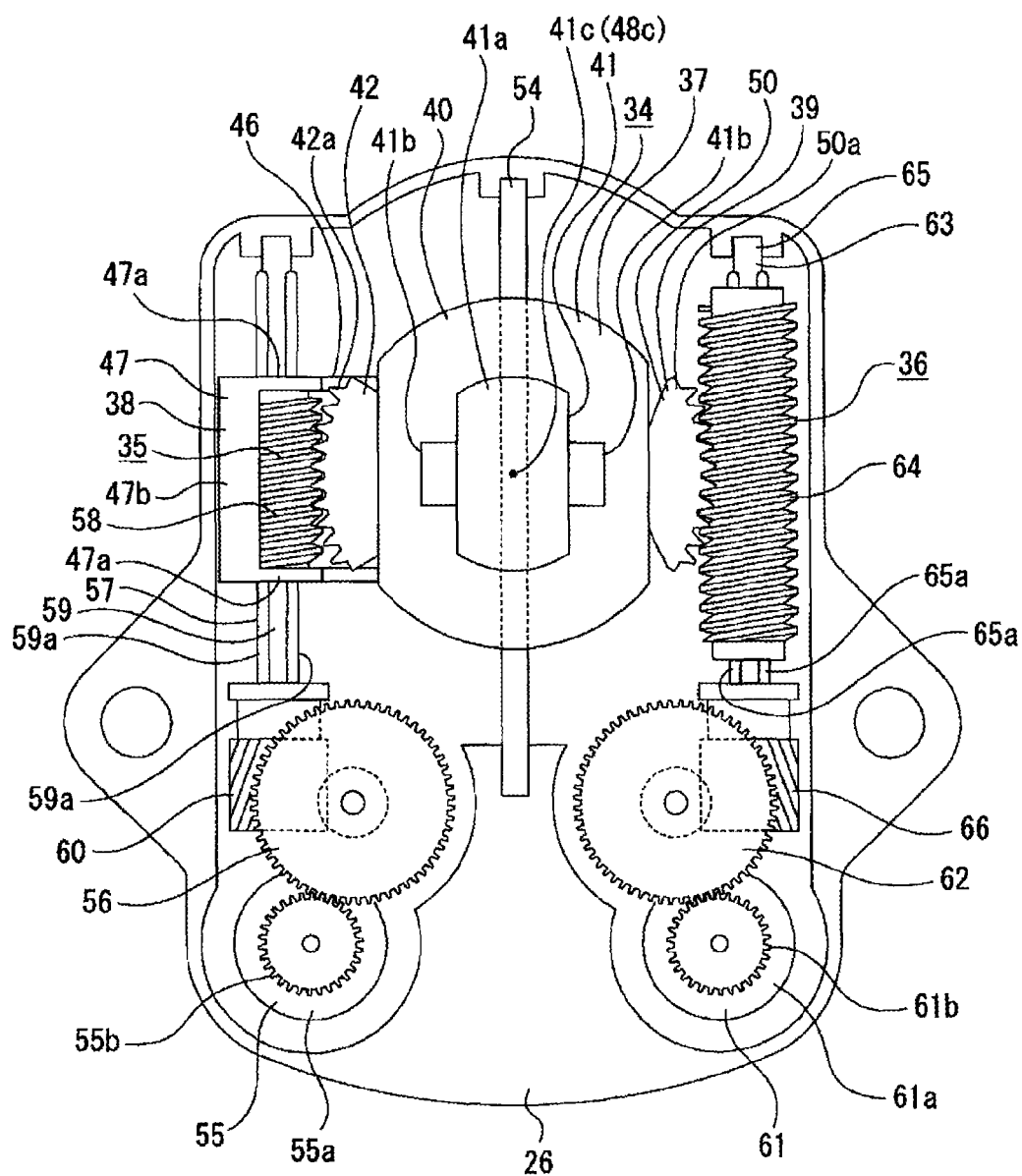
FIG. 8 is a plan view illustrating a state of a drive mechanism of the actuator before a swivel operation.
Figure 9:
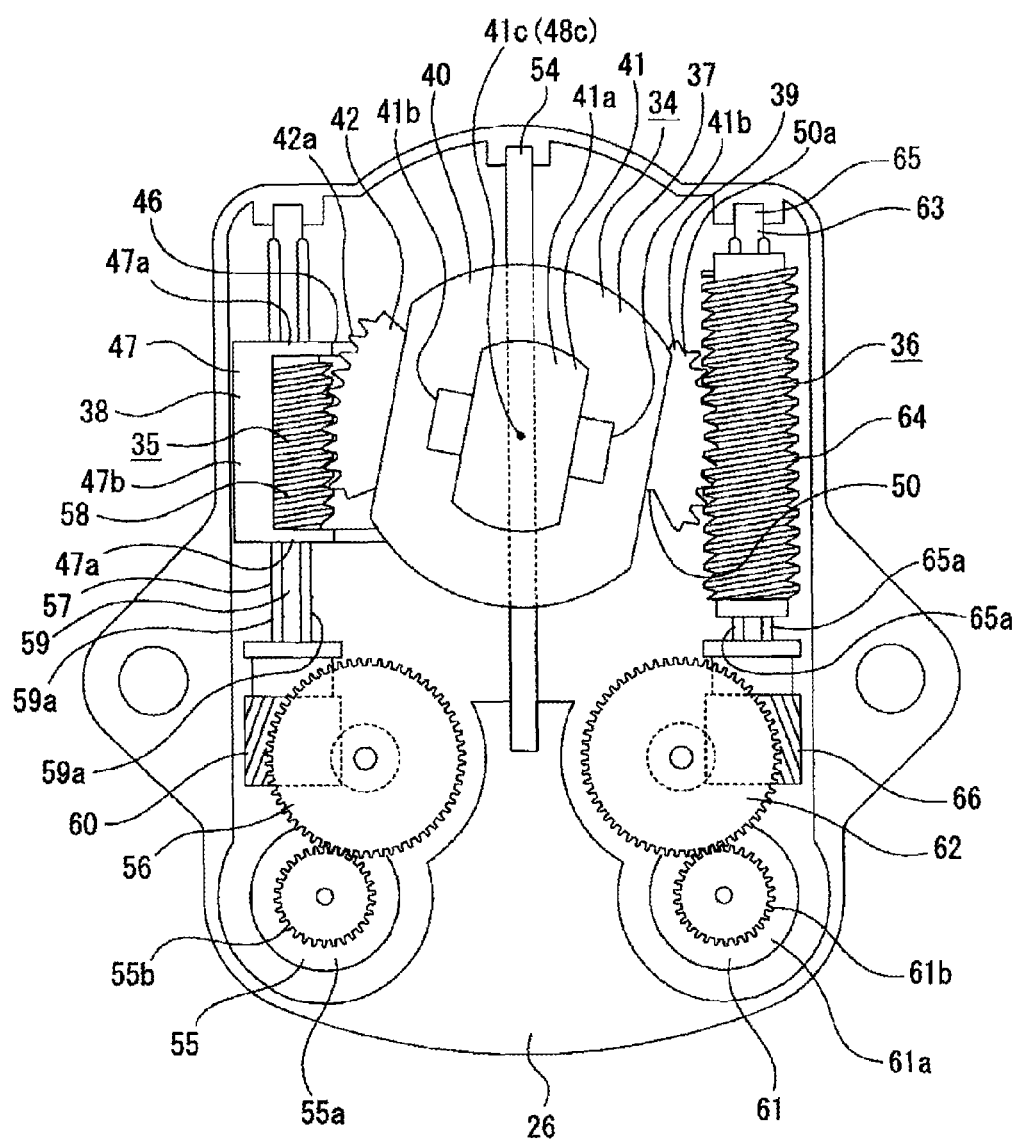
FIG. 9 is a plan view illustrating a state of the drive mechanism of the actuator after the swivel operation.

As shown in FIG. 8, at a state before the swivel operation is performed, the coupling member 37 is located at a neutral position at which the pair of coupling protrusions 41b of the output shaft 41 is arranged at the left and right sides.

When power is fed from a power supply circuit (not shown) through the connector 31 and the swivel motor 55 is thus rotated, a driving force of the swivel motor 55 is transmitted to the first worm 58. When the driving force of the swivel motor 55 is transmitted to the first worm 58, the first gear portion 42a is sent in a direction along the rotating direction of the first worm 58. Thereby, as shown in FIG. 9, the coupling member 37 is rotated relative to the support member 38 and the driven member 39 about the shaft center 41c. As the coupling member 37 is rotated, the lamp unit 10 is rotated in the left-right direction, so that the swivel operation is performed.

At this time, the guide member 54 is inserted into the pair of insertion holes 42b of the coupling member 37. However, since each insertion hole 42b has a shape that is long in the left-right direction, the contact between the coupling member 37 and the guide member 54 is avoided upon the rotation.

Subsequently, the leveling operation is described with reference to FIGS. 10 and 11.

Figure 10:
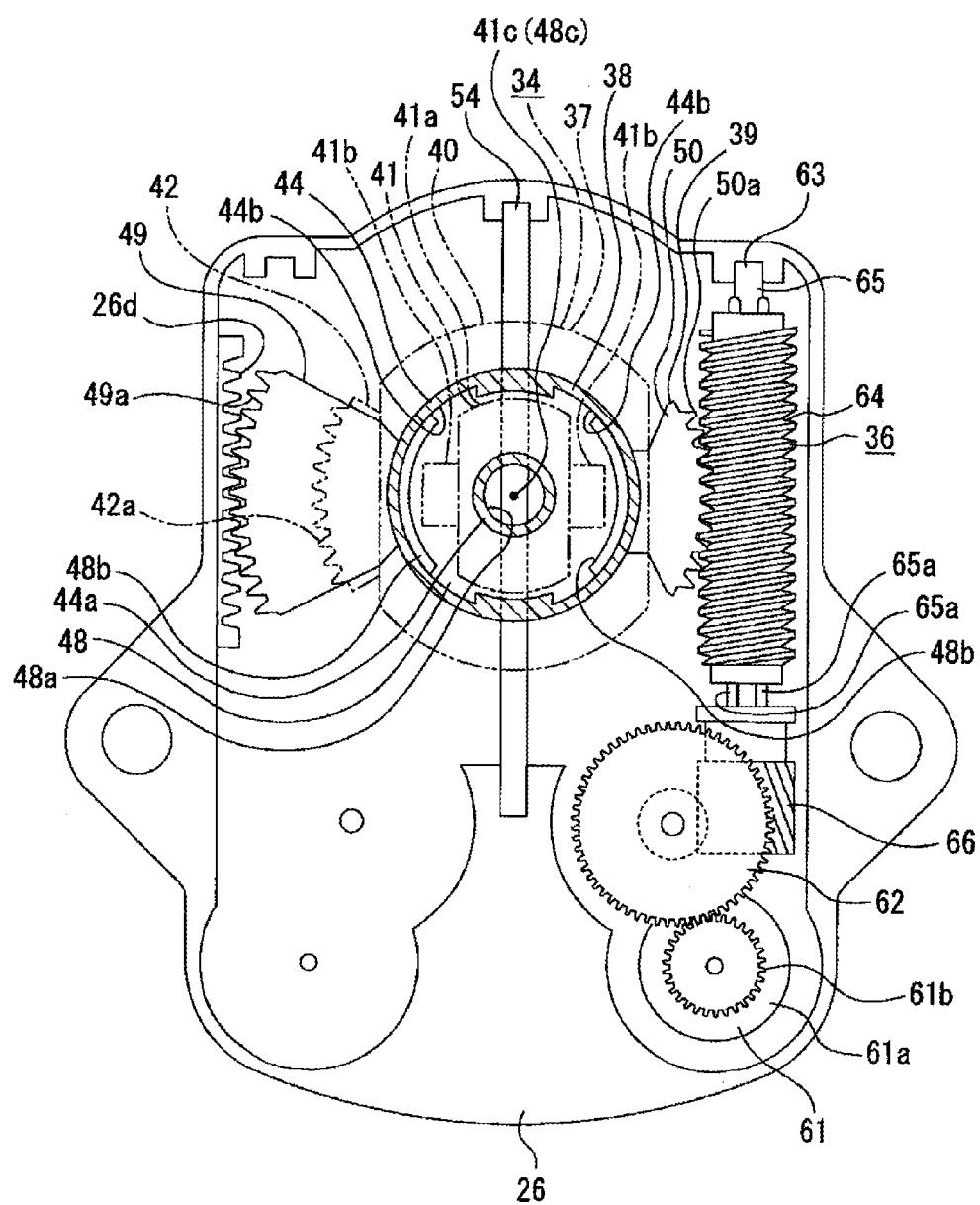
FIG. 10 is a plan view illustrating a state of the drive mechanism of the actuator before a leveling operation.
Figure 11:
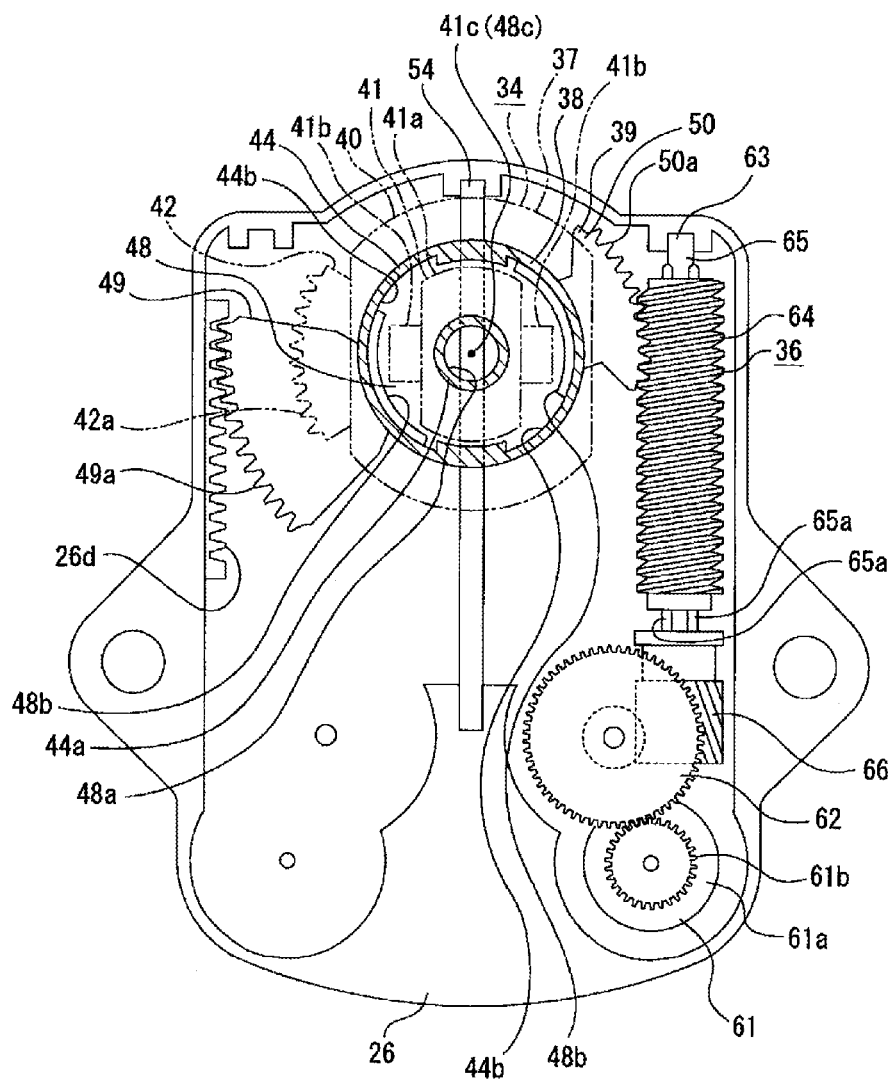
FIG. 11 is a plan view illustrating a state of the drive mechanism of the actuator after the leveling operation.

As shown in FIG. 10, at a state before the leveling operation is performed, the coupling member 37 is located at the neutral position at which the coupling protrusions 41b of the output shaft 41 are arranged at the left and right sides. The coupling unit 34 is arranged at a center within a moving range in the front-rear direction.

When the power is fed from the power supply circuit (not shown) through the connector 31 and the leveling motor 61 is thus rotated, a driving force of the leveling motor 61 is transmitted to the second worm 64. When the driving force of the leveling motor 61 is transmitted to the second worm 64, the second gear portion 50a is sent in a direction along the rotating direction of the second worm 64. Thereby, as shown in FIG. 11, the meshing position of the driven member 39 with the rack portion 26d of the follower gear portion 49a is changed and the driven member 39 is moved in the front-rear direction while being rotated. As the driven member 39 is moved in the front-rear direction while being rotated, the pair of insertion projections 48b is slid relative to the base part 44 of the support member 38, and the support member 38 and the coupling member 37 are integrally moved in the front-rear direction.

As the coupling member 37 is moved in the front-rear direction integrally with the support member 38 and the driven member 39, the lamp unit 10 is rotated in the upper-lower direction in conjunction with the movement of the coupling member 37, so that the leveling operation is performed.

At this time, the coupling unit 34 is guided in the front-rear direction by the guide member 54 and the first worm 58 is moved in the front-rear direction relative to the shaft portion 59 of the first shaft 57.

Subsequently, an operation of detecting an initial position of the lamp unit 10 before the leveling operation and the swivel operation are performed is described with reference to FIGS. 12 to 15.

When an initial position of the lamp unit 10 is detected, the lamp unit 10 is rotated in the upper-lower direction or left-right direction by a predetermined amount about the detected initial position, so that the leveling operation or swivel operation is performed.

First, the operation of detecting the initial position that is performed before the leveling operation starts is described with reference to FIG. 12.

Figure 12A:
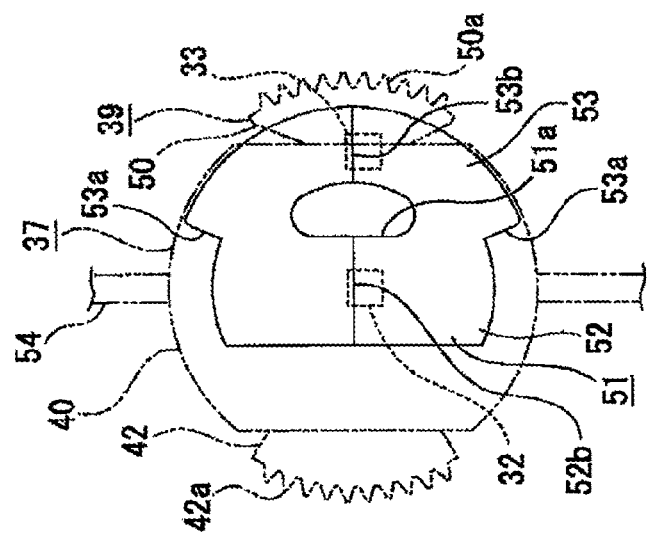
FIGS. 12A-12C are views illustrating an operation of the drive mechanism of the actuator when detecting an initial position of the leveling operation.
Figure 12B:
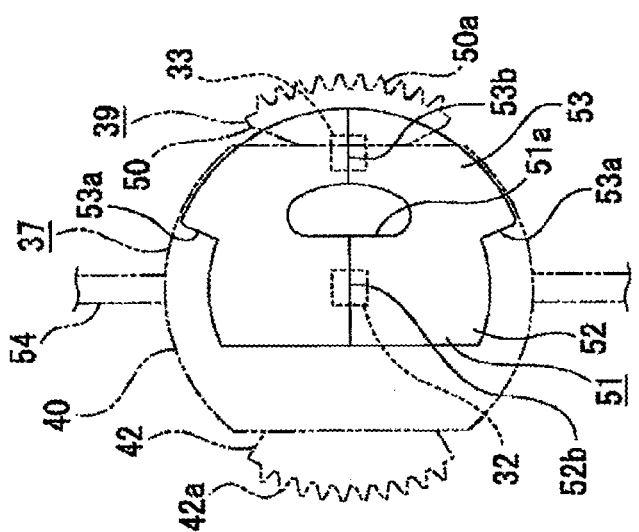

As shown in FIG. 12B, at a state before the leveling operation starts, the coupling unit 34 is arranged at a center in the front-rear direction (moving direction) or in the vicinity of the center.

Figure 12C:
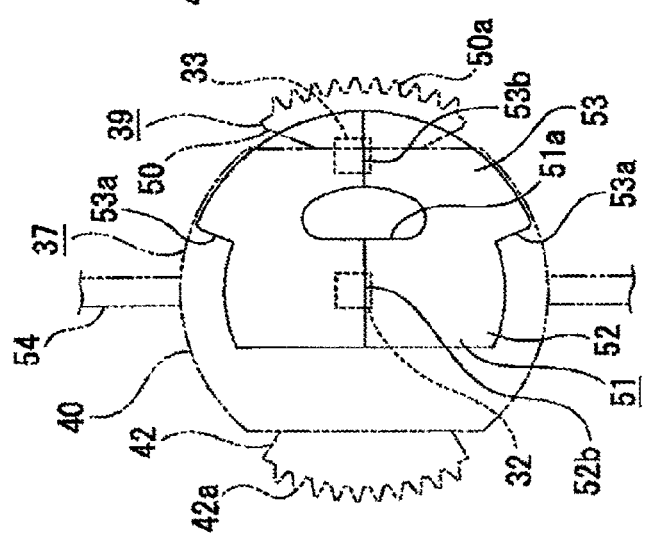

As shown in FIG. 12A or 12C, when the detection magnet 51 is moved forwards or rearwards by a slight distance, for example about 1 mm to 2 mm, integrally with the coupling member 37 by the leveling motor 61, a change in the magnetic field of the detection magnet 51 is detected by the first magnetic detection part 32. When the first boundary 52b, which is a position at which the polarity is switched, is detected by the first magnetic detection part 32, the detected position of the first boundary 52b is detected as the initial position in the leveling operation of the coupling unit 34 and the lamp unit 10.

As described above, when the coupling member 37 is moved forwards or rearwards by the slight distance, if the first boundary 52b is not detected, the coupling member 37 is moved in a reverse direction by about 1 mm to 2 mm, for example, on the basis of the neutral position. At this time, when the first boundary 52b, which is a position at which the polarity is switched, is detected by the first magnetic detection part 32, the detected position of the first boundary 52b is detected as the initial position in the leveling operation of the coupling unit 34 and the lamp unit 10.

Subsequently, the operation of detecting the initial position that is performed before the swivel operation starts is described with reference to FIG. 13.

Figure 13A:
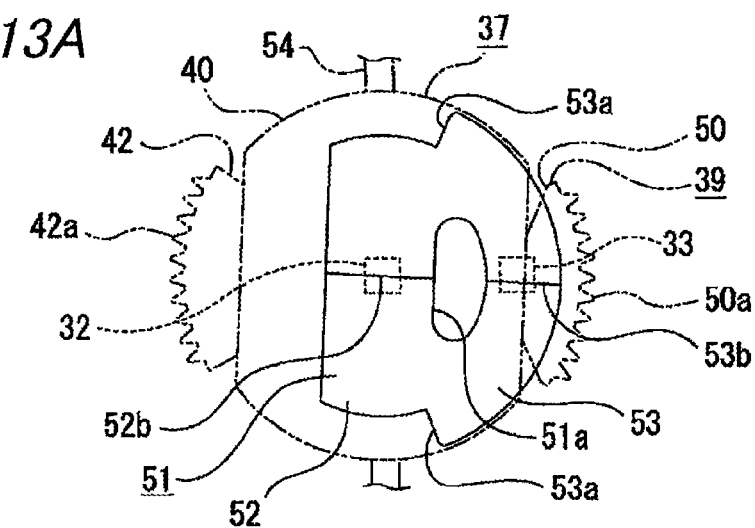
FIGS. 13A-13C are views illustrating an operation of the drive mechanism of the actuator when detecting an initial position of the swivel operation.
Figure 13B:
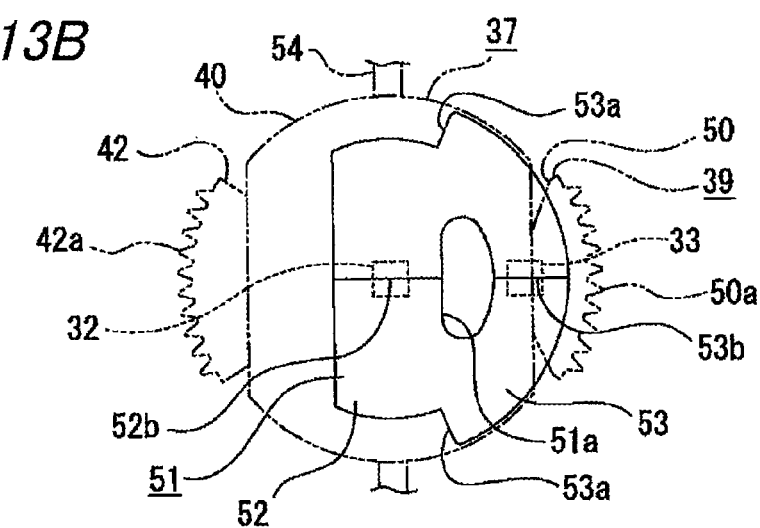

As shown in FIG. 13B, at a state before the swivel operation starts, the coupling member 37 is arranged at the neutral position at which the pair of coupling protrusions 41b of the output shaft 41 is arranged at the left and right sides, or in the vicinity of the neutral position.

Figure 13C:
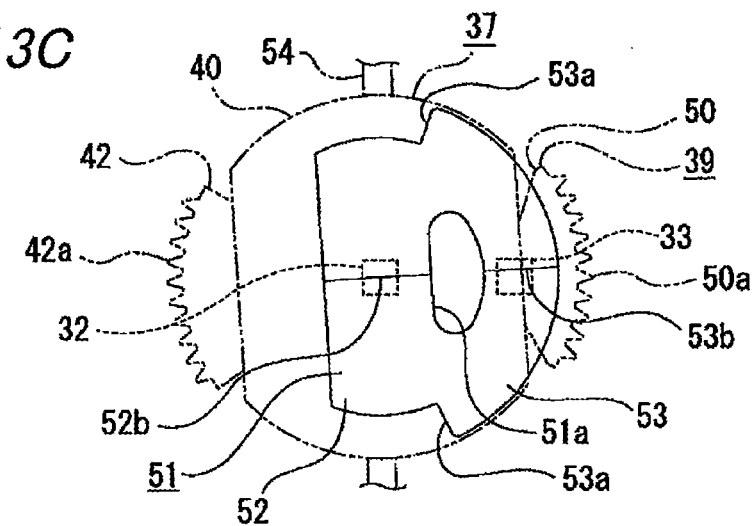

As shown in FIG. 13A or 13C, when the detection magnet 51 is rotated leftwards or rightwards by a slight angle, for example about 1° to 2°, integrally with the coupling member 37 by the swivel motor 55, a change in the magnetic field of the detection magnet 51 is detected by the second magnetic detection part 33. When the second boundary 53b, which is a position at which the polarity is switched, is detected by the second magnetic detection part 33, the detected position of the second boundary 53b is detected as the initial position in the swivel operation of the coupling unit 34 and the lamp unit 10.

As described above, when the coupling member 37 is rotated leftwards or rightwards by the slight angle, if the second boundary 53b is not detected, the coupling member 37 is rotated in a reverse direction by about 1° to 2°, for example, on the basis of the neutral position. At this time, when the second boundary 53b, which is a position at which the polarity is switched, is detected by the second magnetic detection part 33, the detected position of the second boundary 53b is detected as the initial position in the swivel operation of the coupling unit 34 and the lamp unit 10.

In order to precisely detect the initial position, it is preferable to perform the operation of detecting the initial position of the swivel operation after performing the operation of detecting the initial position of the leveling operation.

Figure 14:
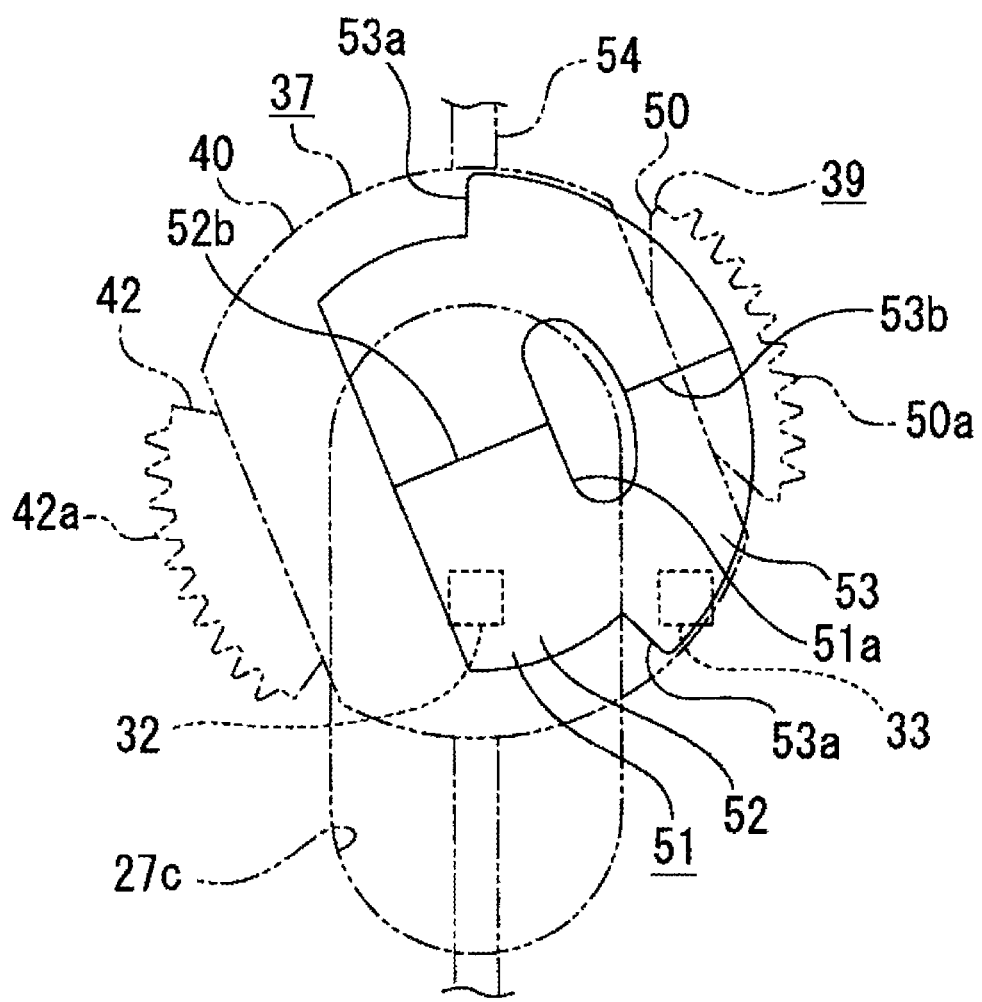
FIG. 14 is a view illustrating a positional relation of a detection magnet and a magnetic detection part when a coupling member is rotated in a state in which the coupling unit is moved to a forward moving end.
Figure 15:
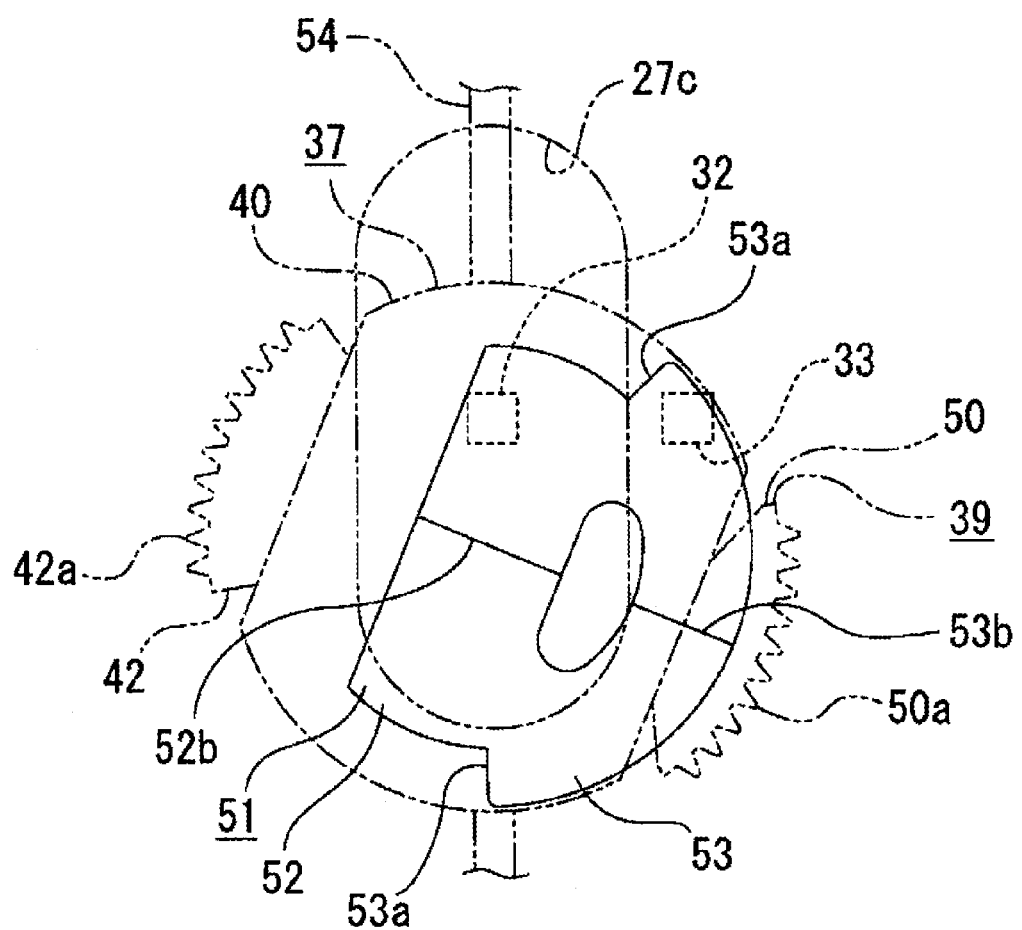
FIG. 15 is a view illustrating a positional relation of the detection magnet and the magnetic detection part when the coupling member is rotated in a state in which the coupling unit is moved to a rearward moving end.

The detection magnet 51 is formed by the first portion 52 and the second portion 53 having different shapes. By forming the detection magnet 51 in such a manner, even when the detection magnet 51 is moved to the front or rear moving end and the swivel operation is performed, the first magnetic detection part 32 and the second magnetic detection part 33 are arranged to face the lower side of the detection magnet 51, as shown in FIGS. 14 and 15. Therefore, it is possible to appropriately perform the detection operation of the initial position, irrespective of the position of the coupling unit 34.

As described above, the vehicle headlamp 1 and the actuator 23 of this embodiment have the coupling member 37, the driven member 39, the first driving unit 35 that performs the swivel operation by rotating the coupling member 37 and the second driving unit 36 that performs the leveling operation by moving the coupling member 37 in the front-rear direction.

Therefore, since the coupling member 37 is rotated by the driving force of the first driving unit 35 and the coupling member 37 is moved by the driving force of the second driving unit 36, it is possible to simplify the control operation while ensuring downsizing.

In this embodiment, the first gear portion 42a provided as the first driven portion is meshed with the first worm 58 and the second gear portion 50a provided as the second driven portion is meshed with the second worm 64.

Therefore, the respective parts are not unnecessarily operated due to vibrations caused upon traveling of the vehicle, for example, so that it is possible to secure the operation reliability. Also, when the coupling member 37 is rotated and moved, the first driving unit 35 and the second driving unit 36 are not moved in the front-rear direction. Thus, it is possible to downsize in the front-rear direction.

In this embodiment, the rack portion 26d that is meshed with the follower gear portion 49a of the driven member 39 and the first worm 48 and second worm 64 that are respectively meshed with the first gear portion 42a and the second gear portion 50a are all provided to extend in the front-rear direction. Therefore, it is possible to downsize in the left-right direction.

In this embodiment, the first shaft 57 is provided to which the first worm 58 is supported by be slidable in the front-rear direction. Therefore, the meshed state of the first gear portion 42a and the first worm 58 is not released upon the leveling operation, so that it is possible to improve the operation reliability in the actuator 23.

In this embodiment, the guide member 54 is provided which guides the driven member 39 in the front-rear direction when the driven member 39 is rotated relative to the coupling member 37 by the second driving unit 36. Therefore, the coupling member 37 is reliably moved in the front-rear direction, so that it is possible to improve the operation reliability in the leveling operation.

In this embodiment, the second gear portion 50a and the follower gear portion 49a are used as the second driven portion and the follower portion of the invention, respectively, and the second worm 64 and the rack portion 26d are meshed with the second gear portion 50a and the follower gear portion 49a, respectively.

However, the invention is not limited to the configuration in which the second driven portion and the follower portion of the invention are engaged by the meshing. For example, the second driven portion and the follower portion of the invention may be engaged with the driving portion and the acting portion of the invention by a frictional force, respectively.

Specifically, the second driven portion and the follower portion of the invention may have a pressed face, respectively, the driving portion and the acting portion of the invention may have a pressing face extending in the front-rear direction, respectively, and the respective pressing faces may be pressed and engaged to the pressed faces, respectively. In this case, the driven member is moved in the front-rear direction while being rotated between the respective pressing faces of the driving portion and the acting portion by an operation of the driving portion, so that the leveling operation is performed.

The vehicle headlamp 1 and the actuator 23 of this embodiment are provided with the first magnetic detection part 32 configured to detect the position of the first boundary 52b to detect a moving position of the coupling member 37 of the coupling unit 34 in the front-rear direction, and the second magnetic detection part 33 configured to detect the position of the second boundary 53b to detect a rotating position of the coupling unit 34 in the horizontal direction, and the first boundary 52b and the second boundary 53b are provided on the coupling unit 34.

Hence, it is possible to detect the initial position of the coupling unit 34 without rotating the lamp unit 10 to the movable limit, so that it is possible to shorten the detection time of the initial position and to prevent a dazzling light.

In this embodiment, the first magnetic detection part 32 is arranged at the position facing the moving path of the shaft center 41c of the output shaft 41 in the front-rear direction. Therefore, it is possible to detect the moving position of the coupling unit 34 quickly and precisely.

In this embodiment, the second magnetic detection part 33 is provided at the left or right side of the first magnetic detection part 32. Therefore, it is possible to detect the rotating position of the coupling member 37 quickly and precisely.

In this embodiment, the first boundary 52b and the second boundary 53b are provided on the detection magnet 51. Hence, it is not necessary to individually provide two detection magnets so as to respectively detect the initial position before the leveling operation and the swivel operation start, so that it is possible to reduce the number of components of the actuator 23 and to simplify the mechanism.

In the following, a vehicle headlamp 101 according to a second embodiment of the invention will be described with reference to FIGS. 16 to 20.

Figure 16:
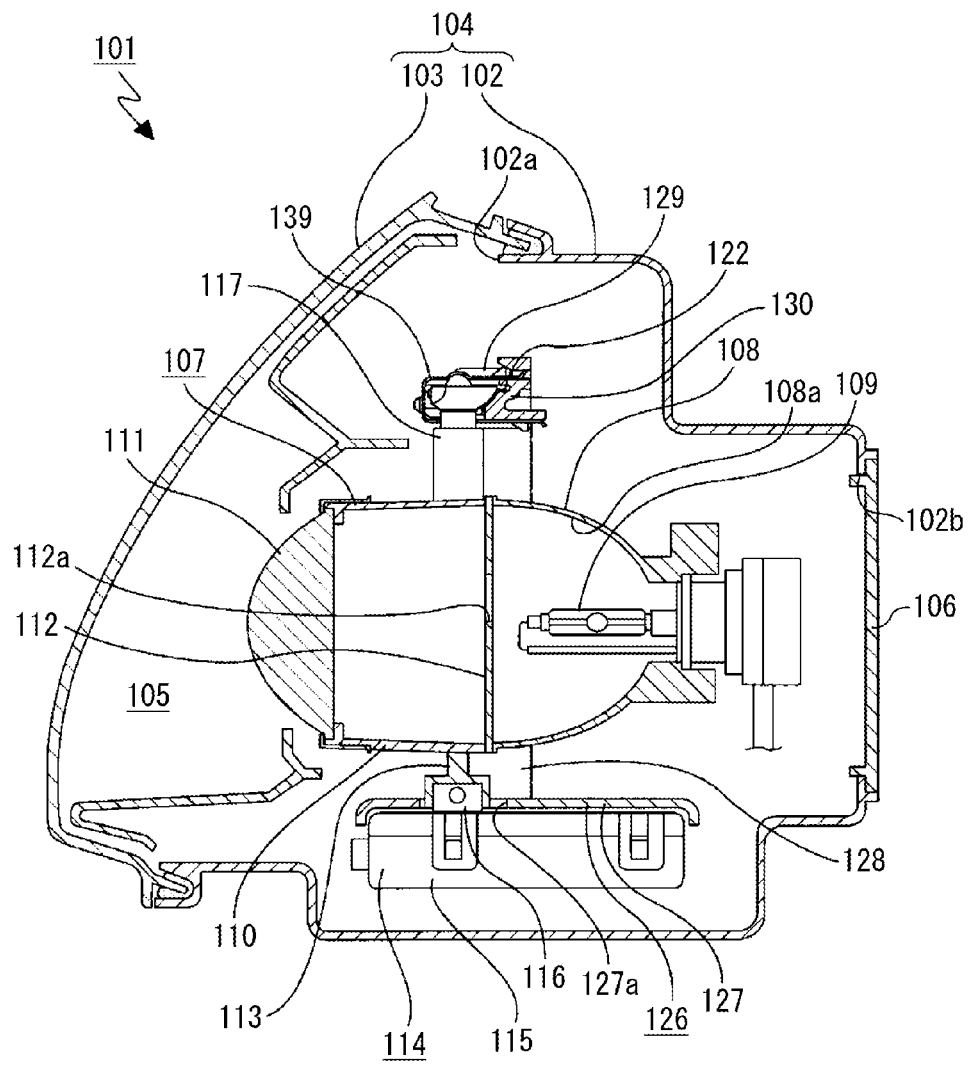
FIG. 16 is a longitudinally sectional view illustrating an internal configuration of a vehicle headlamp according to a second embodiment of the invention.

FIG. 16 is a longitudinally sectional view illustrating an internal structure of the vehicle headlamp 101. The vehicle headlamp 101 is respectively mounted at the left and right end portions of the front end of the vehicle body.

The vehicle headlamp 101 has a lamp housing 102 having a recess portion that is opened forwards and a cover 103 that closes an opening 102a of the lamp housing 102. A lamp outer casing 104 is configured by the lamp housing 102 and the cover 103, and an internal space of the lamp outer casing 104 is formed as a lamp chamber 105.

A rear end portion of the lamp housing 102 is formed with an attaching opening 102b penetrating in the front-rear direction.

A lower end portion of the lamp housing 102 is formed with a back cover 106 that closes the attaching opening 102b.

In the lamp chamber 105, a lamp unit 107 is arranged. The lamp unit 107 has a reflector 108, a light source 109 that is held at a rear end portion of the reflector 108, a lens holder 110 that is positioned at the front of the reflector 108, a projection lens 111 that is held at a front end portion of the lens holder 110 and a shade 112 that is arranged between the reflector 108 and the lens holder 110.

The reflector 108 has a bowl shape that is opened forwards and an inner surface thereof is formed as a reflecting surface 108a. The reflector 108 has a front end portion that is attached to a rear face of the shade 112. The reflector 108 has a function of reflecting light, which is emitted from the light source 109, towards the projection lens 111.

As the light source 109, a discharge lamp is used, for example. In the meantime, a semiconductor light emitting device such as a light emitting diode (LED) may be also used as the light source 109.

The lens holder 110 has a substantially annular shape penetrating in the front-rear direction. The lens holder 110 has a rear end portion that is attached to a front side face of the shade 112.

The projection lens 111 has a function of projecting the light, which is emitted from the light source 109, towards the front.

The shade 112 is formed with a transmission hole 112a. The shade 112 has a function of shielding a part of the light emitted from the light source 109.

A joint member 113 is attached to a lower end portion of the lamp unit 107.

An actuator 114 is arranged at a lower side of the lamp unit 107. The actuator 114 has a case body 115, a drive mechanism (not shown) that is arranged in the case body 115 and a drive shaft 116 that is connected to the drive mechanism. The drive shaft 116 is arranged to protrude upwards from the case body 115. The actuator 114 can be rotated in the left-right direction as the drive shaft 116 is moved in the front-rear direction. The drive shaft 116 of the actuator 114 is connected to the joint member 113.

Figure 17:
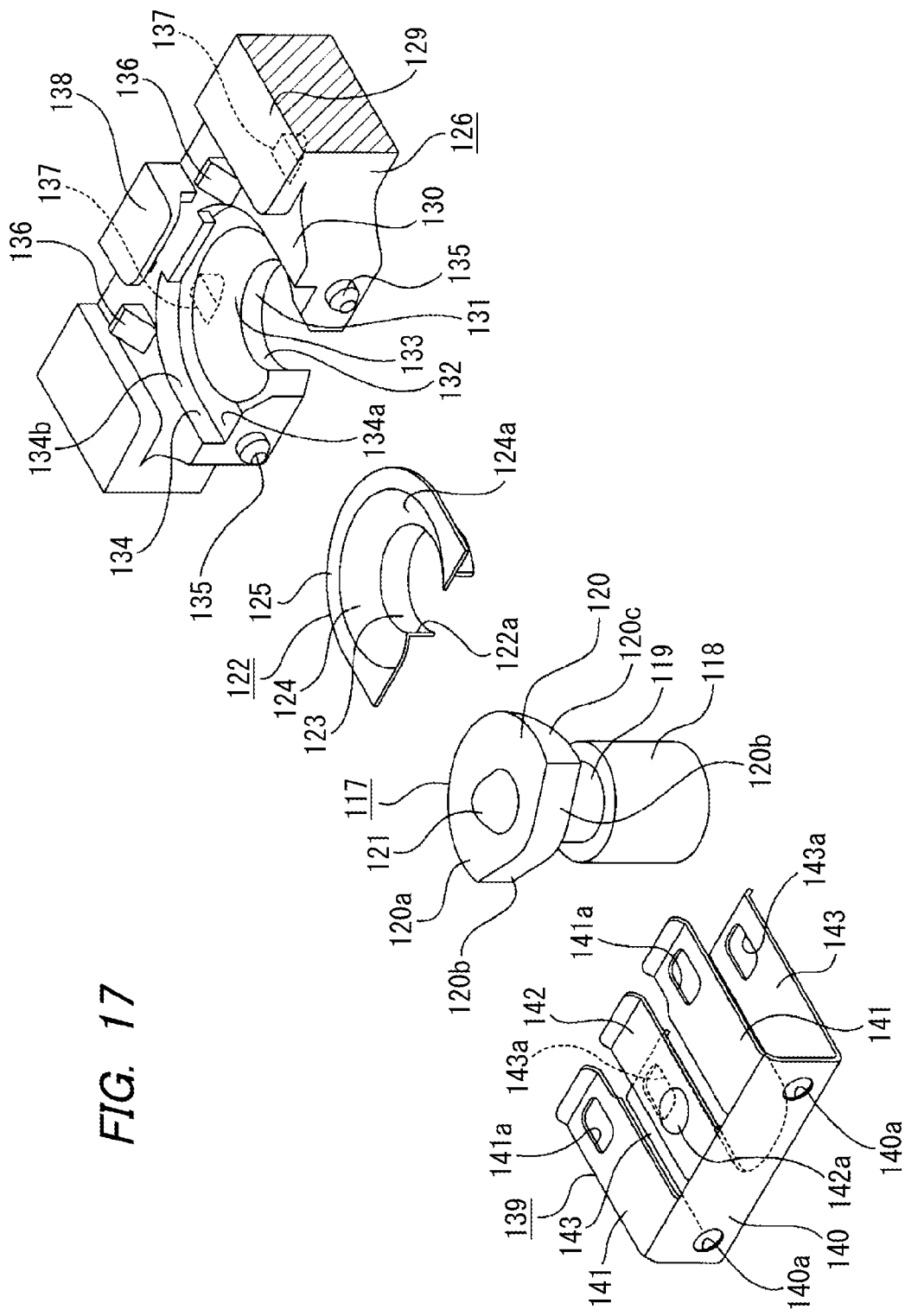
FIG. 17 is an exploded perspective view illustrating a mechanism arranged inside a lamp chamber of the vehicle headlamp of FIG. 16.
Figure 18:
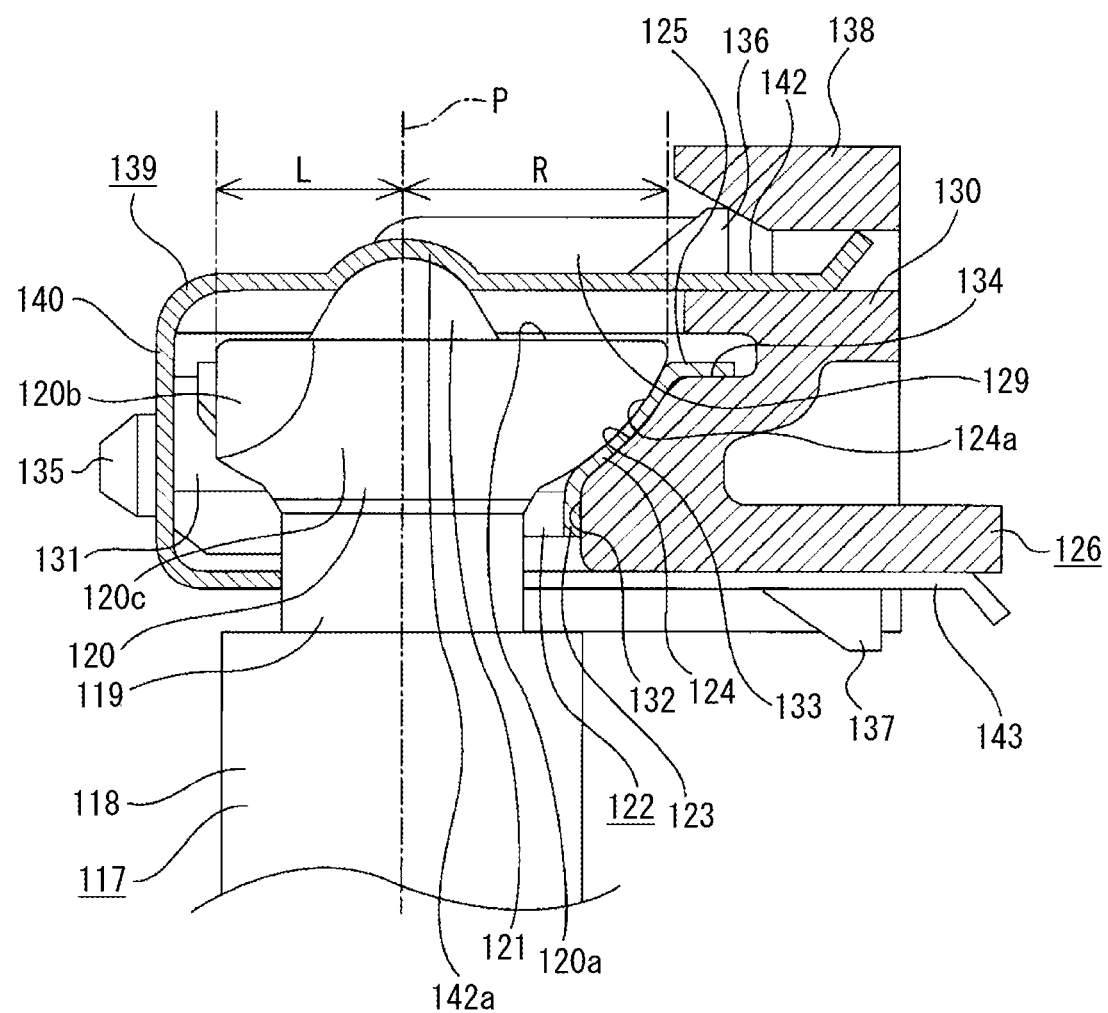
FIG. 18 is an enlarged sectional view illustrating a state in which a shaft holding member is supported by a shaft supporting portion of a bracket and in which a swivel shaft is supported by the bracket via an intermediate member.

An upper end portion of the lamp unit 107 is attached with a swivel shaft 117 with protruding upwards. As shown in FIGS. 17 and 18, the swivel shaft 117 has a cylindrically-shaped shaft portion 118 extending in the upper-lower direction, a connecting part 119 having a shaft shape and provided at an upper side of the shaft portion 118 and a supported portion 120 provided at an upper side of the connecting part 119, which are integrally made of a resin material.

An outer diameter of the connecting part 119 is smaller than that of the shaft portion 118. A central axis of the connecting part 119 is arranged on the same axis as a central axis P of the shaft portion 118.

The supported portion 120 has a pressed face 120a having an outer face that is substantially directed upwards, a pair of restrained faces 120b each having an upper edge contiguous with an outer peripheral edge of the pressed face 120a, and a slide face 120c having an upper edge contiguous with the outer peripheral edge of the pressed face 120a. A portion of the outer peripheral edge of the pressed face 120a that is contiguous with the slide face 120c has an arc shape having a center at the central axis P of the shaft portion 118, and portions that are contiguous with the restrained faces 120b are formed to have a substantial linear shape respectively.

The restrained faces 120b are respectively directed in an oblique front-left direction and in an oblique front-right direction and are continuously formed in the left-right direction.

The slide face 120c is formed to have a downwardly convex spherical surface. The slide face 120c is arranged at a rear-lower side of the restrained faces 120b and is contiguous with lower edges and left and right side edges of the restrained faces 120b.

As shown in FIG. 18, the supported portion 120 is configured so that a distance L from the central axis P of the shaft portion 118 to an upper edge of the restrained face 120b is shorter than a distance R from the central axis P of the shaft portion 118 to the upper edge of the slide face 120c. The distance L is a distance from the central axis P of the shaft portion 118 to any position of the upper edge of the restrained face 120b.

The pressed face 120a of the supported portion 120 is provided with a restrained protrusion 121 protruding upwards. The restrained protrusion 121 is formed to have an upwardly convex hemispherical shape, for example. The restrained protrusion 121 is arranged so that a center of the hemisphere is positioned on the central axis P of the shaft portion 118.

The swivel shaft 117 is supported by an intermediate member 122. The intermediate member 122 has a shape that is opened forwards and in the upper-lower direction. The intermediate member 122 has a surround part 123 that is arranged at a lower side, a receiving part 124 that extends from an upper end of the surround part 123 in an oblique outer-upper direction and a U-shaped flange part 125 that extends outwards from an upper end of the receiving part 124 and is opened forwards, which are integrally made of a metal material. Front end positions of the receiving part 124 and the flange part 125 aligned with each other.

The surround part 123 has a substantially semi-cylindrical shape.

An inner surface of the receiving part 124 is formed as a sliding contact surface 124a to which the slide face 120c of the supported portion 120 is sliding-contacted.

The connecting part 119 is inserted through an opening 122a, which is formed at a front side of the intermediate member 122, so that the swivel shaft 117 is supported by the intermediate member 122. At this time, the connecting part 119 is arranged at an inner side of the surround part 123 and the slide face 120c of the supported portion 120 is contacted to the sliding contact surface 124a of the receiving part 124.

The intermediate member 122 is attached to a bracket 126. The bracket 126 is supported by the lamp housing 102 and can be tilted in the left-right and upper-lower directions by an aiming adjustment mechanism (not shown).

As shown in FIG. 16, the bracket 126 has a base part 127 that is directed in the upper-lower direction, a pair of pillar portions 128 (only one is shown in FIG. 16) protruding upwards from left and right end portions of the base part 127, respectively and an arm part 129 connecting upper end portions of the pillar portions 128. The bracket 126 is made of a resin material. The base part 127 is formed with an insertion hole 127a. The base part 127 is positioned at an upper side of the actuator 114, and the joint member 113 and the drive shaft 116 are inserted into the insertion hole 127a.

A central portion of the arm part 129 in the left-right direction is provided with a shaft supporting portion 130.

The shaft supporting portion 130 is formed with a bearing recess portion 131. The bearing recess portion 131 has a shape that is opened forwards and in the upper-lower direction. The bearing recess portion 131 has a shaft insertion face 132 that is positioned at a lower side, a receiving face 133 that is contiguous with an upper side of the shaft insertion face 132 and a member support face 134 that is contiguous with an outer side of the receiving face 133.

The shaft insertion face 132 has an arc-face shape. The receiving face 133 has a mortar shape. The member support face 134 is formed to have a forwardly opened U shape, and has a placing face 134a that is directed upwards and a restraint face 134b that is contiguous with an outer peripheral edge of the placing face 134a and is directed inwards.

A front-side face of the shaft supporting portion 130 is provided at left and right sides thereof with a pair of positioning protrusions 135 protruding forwards.

At a location near the rear end of an upper face of the shaft supporting portion 130, a pair of upwardly protruding upper side engaging protrusions 136 is provided in a laterally spaced manner. At a location near the rear end of a lower face, a pair of downwardly protruding lower side engaging protrusions 137 is provided in a laterally spaced manner.

At the rear of the bearing recess portion 131 on the upper surface of the shaft supporting portion 130, an insertion part 138 that is opened forwards is arranged between the upper side engaging protrusions 136.

The intermediate member 122 to which the swivel shaft 117 is supported is inserted into the bearing recess portion 131. At this time, the surround part 123 is arranged at an inner side of the shaft insertion face 132, the receiving part 124 abuts on the receiving face 133 and the flange part 125 abuts on the member support face 134. The flange part 125 is fitted to the member support face 134 and is restrained from rotating by the restraint face 134b, so that the intermediate member 122 is non-rotatably attached to the shaft supporting portion 130 of the bracket 126.

As described above, in a state in which the intermediate member 122 is attached to the bracket 126, the swivel shaft 117 is supported by the intermediate member 122 and the swivel shaft 117 can be tilted in the upper-lower direction and can be rotated in the left-right direction (the horizontal direction) relative to the bracket 126 via the intermediate member 122.

A shaft holding member 139 is attached to the shaft supporting portion 130 of the bracket 126. As shown in FIG. 17, the shaft holding member 139 has a base face portion 140 that is directed in the front-rear direction, a pair of upper side engaging parts 141 that extends rearwards from left and right end portions on an upper edge of the base face portion 140, respectively, a holding portion 142 that extends rearwards from a central portion of the upper edge of the base face portion 140 and a pair of lower side engaging parts 143 that extends rearwards from left and right end portions of a lower edge of the base face portion 140, which are integrally made of a metal material having elasticity.

The base face portion 140 is formed with a pair of positioning holes 140a that is spaced at left and right sides. A rear end portion of each upper side engaging part 141 is formed with an engaging hole 141a. A central portion of the holding portion 142 in the front-rear direction is provided with a restraint part 142a that is upwardly convex and has a substantially hemispherical shape. A rear end portion of each lower side engaging part 143 is formed with an engaging hole 143a.

In a state in which the swivel shaft 117 is supported by the shaft supporting portion 130 of the bracket 126 via the intermediate member 122, the shaft holding member 139 is attached to the shaft supporting portion 130 of the bracket 126.

Figure 19:
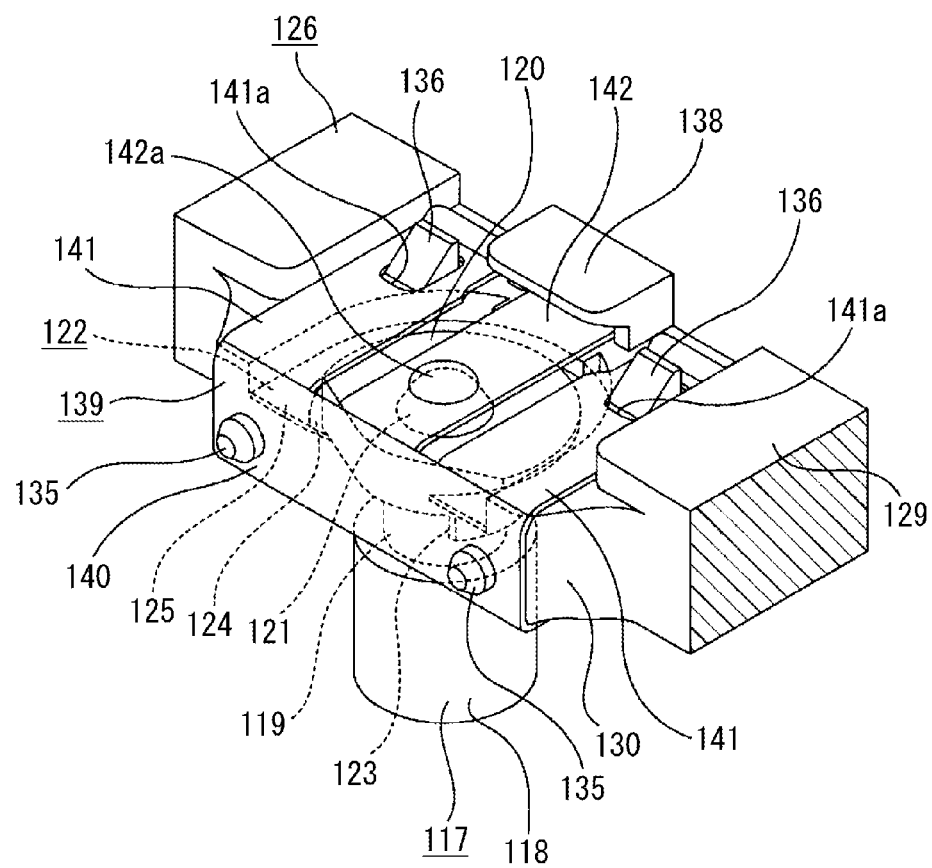
FIG. 19 is a perspective view illustrating a state in which the shaft holding member is supported by the shaft supporting portion of the bracket and the swivel shaft is supported by the bracket via the intermediate member.

The shaft holding member 139 is elastically deformed so that an interval between the upper side engaging parts 141 and the lower side engaging parts 143 is widened and is then elastically restored, so that the engaging holes 141a of the respective upper side engaging parts 141 and the engaging holes 143a of the respective lower side engaging parts 143 are engaged with the corresponding upper side engaging protrusions 136 and the lower side engaging protrusions 137, respectively. Thereby, as shown in FIGS. 18 and 19, the shaft holding member 139 is attached to the shaft supporting portion 130 of the bracket 126. At this time, the respective positioning protrusions 135 of the shaft supporting portion 130 are fitted into the respective positioning holes 140a of the base face portion 140 and a tip of the holding portion 142 is inserted into the insertion part 138 of the shaft supporting portion 130.

When the shaft holding member 139 is attached to the shaft supporting portion 130, the restrained protrusion 121 is pressed from above by the holding portion 142 while being inserted into the restraint part 142a of the holding portion 142.

Also, a front end of the intermediate member 122 is arranged in the vicinity of a rear face of the base face portion 140 and the forward moving of the intermediate member 122 is restrained by the shaft holding member 139.

In the vehicle headlamp 101 configured as described above, when the drive shaft 116 of the actuator 114 is rotated, a driving force of the actuator 114 is transmitted to the lamp unit 107 through the joint member 113. In accordance with the rotating direction of the drive shaft 116, the lamp unit 107 and the swivel shaft 117 are integrally rotated in the left-right direction, so that the swivel operation is performed. When the lamp unit 107 is rotated, the central axis P of the shaft portion 118 of the swivel shaft 117 becomes the rotation center and the slide face 120c of the swivel shaft 117 is sliding-contacted to the sliding contact surface 124a of the receiving part 124 of the intermediate member 122.

By the above swivel operation, the lamp unit 107 is rotated in the left-right direction in connection with the traveling direction of the vehicle and the direction of the optical axis is changed in accordance with the traveling direction of the vehicle.

Also, the vehicle headlamp 101 is adapted to perform the leveling operation or optical axis adjustment that is aiming adjustment.

The drive shaft 116 is moved in the front-rear direction by the drive mechanism and the lamp unit 107 is tilted in the upper-lower direction relative to the bracket 126 about the restrained protrusion 121 of the swivel shaft 117, which serves as a pivot, so that the leveling operation is performed. At this time, the slide face 120c of the swivel shaft 117 is sliding-contacted to the sliding contact surface 124a of the intermediate member 122.

The bracket 126, the lamp unit 107 and the actuator 114 are integrally tilted in the upper-lower direction or left-right direction relative to the lamp housing 102 by an operation of the aiming mechanism, so that the aiming adjustment is performed.

During the swivel operation, due to the vibrations upon the traveling of the vehicle or inertia of the lamp unit 107, the lamp unit 107 may be applied with a force of rotating the same by a given angle or larger.

Figure 20:
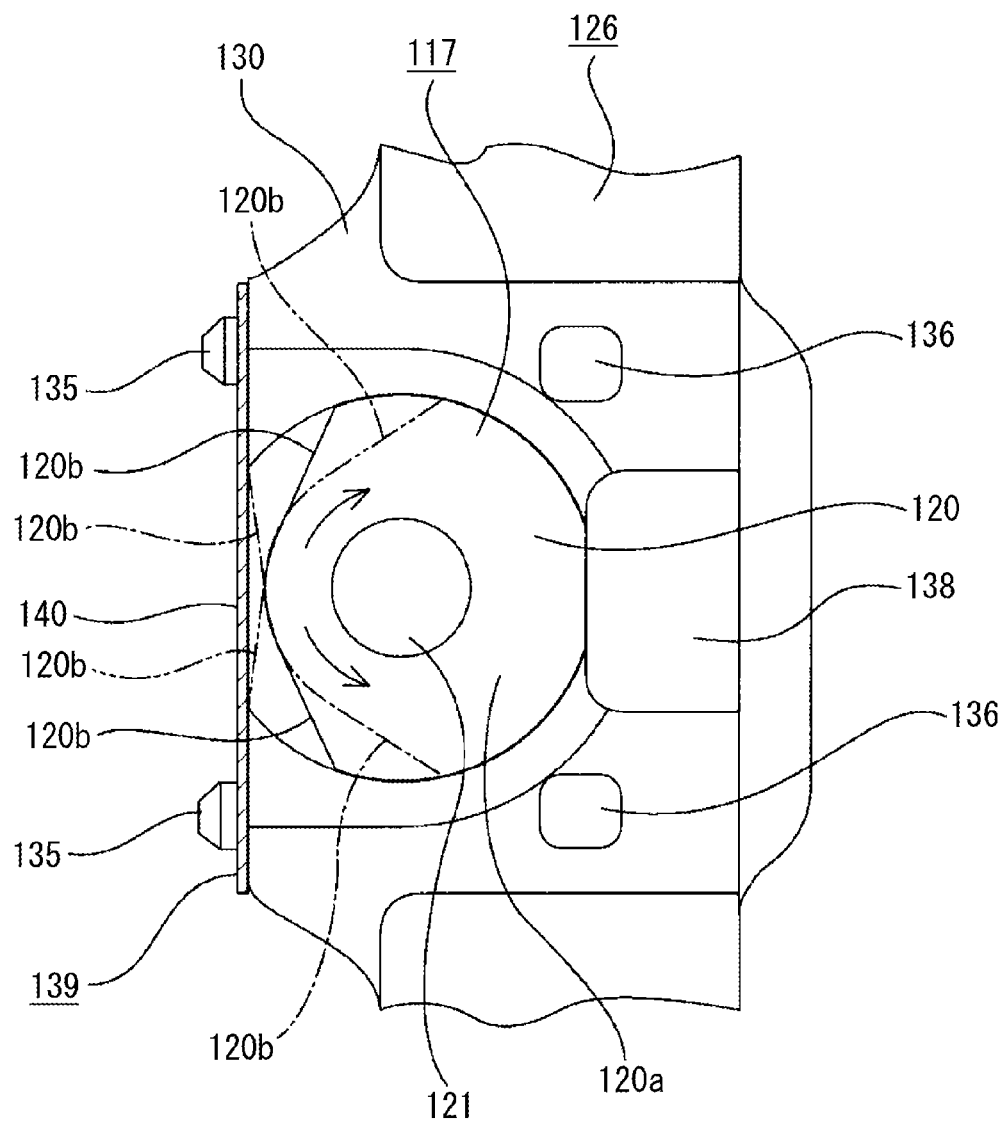
FIG. 20 is a plan view illustrating a state in which the supported portion is brought into contact with the shaft holding member upon rotation of the swivel shaft and the rotation of the swivel shaft is thus restrained.

In this case, according to the vehicle headlamp 101 of this embodiment, as shown in FIG. 20, the pair of restrained faces 120b of the supported portion 120 of the swivel shaft 117, which is rotated integrally with the lamp unit 107, is contacted to the rear face of the base face portion 140 of the shaft holding member 139. For example, when the lamp unit 107 is rotated up to a given angle in the left direction, the swivel shaft 117 is rotated leftwards, so that the one restrained face 120b is contacted to the base face portion 140 of the shaft holding member 139, as shown with a dashed-dotted line in FIG. 20. Likewise, when the lamp unit 107 is rotated up to a given angle in the right direction, the swivel shaft 117 is rotated rightwards, so that the other restrained face 120b is contacted to the base face portion 140 of the shaft holding member 139, as shown with a dashed-two dotted line in FIG. 20.

Like this, the pair of restrained faces 120b is contacted to the base face portion 140, so that the rotation of the swivel shaft 117 is restrained and the rotation of the lamp unit 107, which is rotated integrally with the swivel shaft 117, is also restrained. Thereby, it is possible to restrain the excessive rotation of the lamp unit 107.

Also, the lamp unit 107 may be applied with a forward force, due to the vibrations upon the traveling of the vehicle or shock. At this time, the swivel shaft 117 is also applied with the forward force.

However, according to the vehicle headlamp 101 of this embodiment, the restrained protrusion 121 of the swivel shaft 117 is pressed from above by the holding portion 142 while being inserted into the restraint part 142a of the holding portion 142.

Therefore, since a force against the forward force is applied to the restrained protrusion 121 by the restraint part 142a, it is possible to restrain the swivel shaft 117 from being moved forwards. Thereby, it is possible to prevent the lamp unit 107 from being position-deviated from the bracket 126.

The shape of the restraint part 142a of the shaft holding member 139 is not limited to the shape that is upwardly convex and is substantially hemispherical. The restraint part 142a may have another shape as long as the shape can restrain the swivel shaft 117 from being moved forwards in a state in which the swivel shaft 117 can be rotated in the left-right direction.

The restraint of the forward moving of the swivel shaft 117 is not necessarily performed by the recess portion that is formed at the restraint part 142a of the shaft holding member 139. Instead of the restraint hole that is opened in the upper-lower direction, the recess portion may be configured so that the restrained protrusion 121 of the swivel shaft 117 is inserted into the restraint hole. In this case, the pressed face 120a of the swivel shaft 117 is pressed from above by the holding portion 142 of the shaft holding member 139 and the swivel shaft 117 is restrained from being moved forwards by the restraint hole that is formed as the restraint part.

As described above, according to the vehicle headlamp 101 of this embodiment, the supported portion 120 of the swivel shaft 117 is formed with the slide face 120c, which slides upon the rotation of the lamp unit 107, and the pair of restrained faces 120b that can be contacted to the shaft holding member 139 upon the rotation of the swivel shaft 117. Also, the distance L from the rotation center of the swivel shaft 117 to the upper edges of the restrained face 120b is shorter than the distance R from the rotation center of the swivel shaft 117 to the upper edge of the slide face 120c.

Hence, since the forward protruding of the supported portion 120 is small, it is possible to avoid the interference between the supported portion 120 and shaft holding member 139 and the peripheral components to be arranged around the same.

Also, the pair of restrained faces 120b is contacted to the shaft holding member 139, so that the swivel shaft 117 is restrained from being rotated by the given angle or larger. Therefore, the excessive rotation of the lamp unit 107 is prevented. That is, the swivel shaft 117 has the function of preventing the excessive rotation of the lamp unit 107. Therefore, it is not necessary to separately provide a structure for restraining the excessive rotation of the lamp unit 107 in the lamp outer casing 104, so that it is possible to restrain the excessive rotation of the lamp unit 107 while simplifying the structure.

Also, according to the vehicle headlamp 101 of this embodiment, the intermediate member 122 that is interposed between the bracket 126 and the swivel shaft 117 and the supported portion 120 slides thereto upon the rotation of the lamp unit 107 is provided. The intermediate member 122 is made of a metal material.

At the time of the rotation of the swivel shaft 117, since the supported portion 120 made of a resin material is in sliding-contact with the intermediate member 122 made of a metal material, cut powders resulting from the sliding contact are less likely to be generated, and the swivel shaft 117 and the bracket 126 are less likely to wear. Therefore, the durability of the swivel shaft 117 and the bracket 126 is improved, so that it is possible to maintain the smooth operating state of the lamp unit 107.

The above embodiments are provided to facilitate understanding of the invention and do not limit the invention. The invention can be changed or modified without departing from the gist thereof and includes equivalents of the embodiments.

In the embodiments, the rotating direction (the first direction according to an aspect of the invention) and moving direction (the second direction according to an aspect of the invention) of the lamp unit 10 (107) by the actuator 23 (114) are not limited to the left-right direction and front-rear direction of the vehicle, respectively. The directions can be appropriately determined depending on the specifications of the lamp to which the lamp unit 10 (107) is mounted.

This application is based on Japanese Patent Application No. 2011-194794 filed on Sep. 7, 2011, Japanese Patent Application No. 2011-247797 filed on Nov. 11, 2011 and Japanese Patent Application No. 2011-247798 filed on Nov. 11, 2011, the contents of which are incorporated herein by reference.

The invention claimed is:

1. An actuator comprising:
a coupling member comprising an output shaft to be coupled to a lamp unit and a first driven portion, the coupling member being rotatable in a first direction about a shaft center of the output shaft;
a driven member comprising a second driven portion arranged on a first side of a rotation center aligned with the shaft center and a follower portion arranged on a second side of the rotation center opposite to the first side, the driven member being rotatable relative to the coupling member about the rotation center;
an acting portion engaged with the follower portion;
a first driving unit engaged with the first driven portion to rotate the coupling member relative to the driven member about the shaft center; and
a second driving unit engaged with the second driven portion to rotate the driven member relative to the coupling member,
wherein, when the second driving unit rotates the driven member, the acting portion engaged with the follower portion causes the rotation center to linearly move in a second direction and the coupling member is moved together with the driven member in the second direction.

2. The actuator according to claim 1, wherein the first driven portion comprises a first gear portion extending in an arc shape,
wherein the second driven portion comprises a second gear portion extending in an arc shape,
wherein the follower portion comprises a follower gear portion extending in an arc shape,
wherein the acting portion comprises a rack portion,
wherein the first driving unit comprises a first worm meshing with the first gear portion, and
wherein the second driving unit comprises a second worm meshing with the second gear portion.

3. The actuator according to claim 2, wherein the rack portion, the first worm and the second worm extend in the second direction.

4. The actuator according to claim 2, further comprising a shaft supporting the first worm so as to be movable in the second direction,
wherein, when the coupling member is moved in the second direction, the first worm is moved relative to the shaft in the second direction.

5. The actuator according to claim 1, further comprising a guide member arranged to guide the coupling member in the second direction when the second driving unit rotates the driven member relative to the coupling member.

6. The actuator according to claim 1, further comprising:
a first magnetic detection part configured to detect a first boundary of magnetic poles to detect a moving position of the coupling unit in the second direction; and
a second magnetic detection part configured to detect a second boundary of magnetic poles to detect a rotating position of the coupling unit in the first direction,
wherein the coupling member and the driven member form a coupling unit, and
wherein the first boundary and the second boundary are provided on the coupling unit.

7. The actuator according to claim 6, wherein the first magnetic detection part is arranged at a position that faces a moving path of a shaft center of the output shaft in the second direction.

8. The actuator according to claim 6, wherein the first magnetic detection part and the second magnetic detection part are arranged side by side in the first direction.

9. The actuator according to claim 6, wherein a detection magnet having the first boundary and the second boundary is attached to the coupling unit.

10. A vehicle headlamp comprising:
a lamp outer casing comprising a lamp housing having an opening and a cover closing the opening of the lamp housing;
a lamp unit comprising a light source, the lamp unit being arranged inside the lamp outer casing; and
an actuator configured to adjust an irradiation direction of light emitted from the light source, wherein the actuator comprises:

a coupling member comprising an output shaft to be coupled to a lamp unit and a first driven portion, the coupling member being rotatable in a left-right direction about a shaft center of the output shaft;

a driven member comprising a second driven portion arranged on a first side of a rotation center aligned with the shaft center and a follower portion arranged on a second side of the rotation center opposite to the first side, the driven member being rotatable relative to the coupling member about the rotation center;

an acting portion engaged with the follower portion;

a first driving unit engaged with the first driven portion to rotate the coupling member relative to the driven member about the shaft center; and a second driving unit engaged with the second driven portion to rotate the driven member relative to the coupling member, wherein, when the second driving unit rotates the driven member, the acting portion engaged with the follower portion causes the rotation center to linearly move in a front-rear direction and the coupling member is moved together with the driven member in the front-rear direction.

11. The vehicle headlamp according to claim 10, wherein the actuator further comprises:

a first magnetic detection part configured to detect a first boundary of magnetic poles to detect a moving position of the coupling unit in the front-rear direction; and a second magnetic detection part configured to detect a second boundary of magnetic poles to detect a rotating position of the coupling unit in the left-right direction, wherein the coupling member and the driven member form a coupling unit, and wherein the first boundary and the second boundary are provided on the coupling unit.

12. A vehicle headlamp comprising:

a lamp unit configured to forwardly irradiate light emitted from a light source, the lamp unit being rotatable at least in a left-right direction;

a swivel shaft comprising a supported portion, the swivel shaft being attached to the lamp unit in an upwardly protruding manner and serving as a pivot of a rotation in the left-right direction;

a bracket supporting the supported portion so as to be rotatable in the left-right direction, and a shaft holding member attached to the bracket and holding the swivel shaft, wherein the supported portion comprises:

a pressed face pressed by the shaft holding member from above;

a slide face having an upper edge contiguous with an outer peripheral edge of the pressed face and configured to slide when the lamp unit rotates; and a restrained face having an upper edge contiguous with the outer peripheral edge of the pressed face and is configured to contact the shaft holding member when the swivel shaft is rotated by a given angle or more, wherein a distance from a rotation center of the swivel shaft to the upper edge of the restrained face is shorter than a distance from the rotation center of the swivel shaft to the upper edge of the slide face.

13. The vehicle headlamp according to claim 12, wherein the bracket is made of a resin material, wherein the swivel shaft is made of a resin material, and wherein the vehicle headlamp further comprises an intermediate member made of a metal material and interposed between the bracket and the swivel shaft such that the supported portion is brought into sliding-contact with the intermediate member when the lamp unit rotates.

14. The vehicle headlamp according to claim 12, wherein the pressed face comprises a restrained protrusion protruding upwards, and wherein the shaft holding member comprises a holding portion that presses the swivel shaft from above and having a restraint part to which the restrained protrusion is inserted.

* * * * *